US010424968B2

(12) United States Patent
Badr et al.

(10) Patent No.: US 10,424,968 B2
(45) Date of Patent: Sep. 24, 2019

(54) METHODS AND DEVICES FOR CONTROLLING WIRELESS POWER TRANSFER LEVELS

(71) Applicant: UVic Industry Partnerships Inc., Victoria (CA)

(72) Inventors: Basem M. Badr, Victoria (CA); Arthur Makosinski, Victoria (CA); Kerry R. Delaney, Victoria (CA); Nikolai Dechev, Victoria (CA)

(*) Notice: Subject to any disclaimer, the term of this patent is extended or adjusted under 35 U.S.C. 154(b) by 33 days.

(21) Appl. No.: 15/496,863

(22) Filed: Apr. 25, 2017

(65) Prior Publication Data

US 2017/0256992 A1    Sep. 7, 2017

Related U.S. Application Data

(63) Continuation-in-part of application No. 14/978,961, filed on Dec. 22, 2015, now Pat. No. 10,075,026.

(60) Provisional application No. 62/327,352, filed on Apr. 25, 2016, provisional application No. 62/096,386, (Continued)

(51) Int. Cl.
*H01F 38/14* (2006.01)
*H02J 50/12* (2016.01)
*H02M 3/335* (2006.01)
*H01F 27/28* (2006.01)
(Continued)

(52) U.S. Cl.
CPC .............. *H02J 50/12* (2016.02); *H01F 27/28* (2013.01); *H02J 50/60* (2016.02); *H02J 50/70* (2016.02); *H02M 3/33523* (2013.01)

(58) Field of Classification Search
CPC . H02J 50/70; H02J 50/60; H02J 50/12; H01F 27/28; H02M 3/33523
See application file for complete search history.

(56) References Cited

U.S. PATENT DOCUMENTS

| 3,919,656 A | 11/1975 | Sokal et al. |
| 2003/0114769 A1* | 6/2003 | Loeb ................. A61B 5/0031 600/513 |
| 2007/0296393 A1 | 12/2007 | Malpas et al. |

(Continued)

FOREIGN PATENT DOCUMENTS

| WO | WO 2014/018968 | 1/2014 |
| WO | WO 2014/052686 | 4/2014 |
| WO | WO 2015/105924 | 7/2015 |

OTHER PUBLICATIONS

Badr et al., "Design of a Wireless Measurement System for Use in Wireless Power Transfer Applications for Implants," *Journal of Wireless Power Transfer*, Jan. 1, 2017.

(Continued)

*Primary Examiner* — Alfonso Perez Borroto
*Assistant Examiner* — Esayas G Yeshaw
(74) *Attorney, Agent, or Firm* — Klarquist Sparkman, LLP

(57) ABSTRACT

Disclosed herein are embodiments of novel WPT systems, devices, and methods of using the same. Also disclosed herein are methods for controlling the power delivered from a stationary source (e.g., a primary coil) to a moving telemetric device (e.g., a secondary coil) via magnetic resonance coupling. The systems, device, and methods described herein can be used to tune and/or detune resonant frequency between a primary coil and a telemetric device so as to prevent device malfunction and/or tissue damage for the small animals associated with the telemetric device.

20 Claims, 19 Drawing Sheets

Related U.S. Application Data filed on Dec. 23, 2014, provisional application No. 62/191,187, filed on Jul. 10, 2015.

(51) Int. Cl.
*H02J 50/70* (2016.01)
*H02J 50/60* (2016.01)

(56) References Cited

U.S. PATENT DOCUMENTS

| | | | |
|---|---|---|---|
| 2009/0085807 A1 | 4/2009 | Anderson | |
| 2011/0095617 A1* | 4/2011 | Cook | H01Q 7/08 307/104 |
| 2011/0217927 A1* | 9/2011 | Ben-Shalom | H04B 5/0025 455/41.1 |
| 2012/0202435 A1* | 8/2012 | Kim | H04B 5/0037 455/69 |
| 2013/0005278 A1* | 1/2013 | Black | H01Q 1/241 455/77 |
| 2014/0015329 A1* | 1/2014 | Widmer | G01D 5/2006 307/104 |
| 2015/0200562 A1* | 7/2015 | Kilinc | A61B 5/0031 320/108 |
| 2015/0207333 A1* | 7/2015 | Baarman | H02J 5/005 307/104 |
| 2015/0372493 A1* | 12/2015 | Sankar | H02J 7/025 307/104 |
| 2016/0181826 A1 | 6/2016 | Badr et al. | |
| 2017/0033693 A1* | 2/2017 | Madawala | H02M 3/33576 |
| 2017/0093168 A1* | 3/2017 | Von Novak, III | H02J 5/005 |
| 2017/0194815 A1* | 7/2017 | Mach | H02J 50/12 |
| 2017/0223792 A1* | 8/2017 | Elferich | H02M 1/4241 |

OTHER PUBLICATIONS

Badr et al., "Maximizing Wireless Power Transfer Using Ferrite Rods within Telemetric Devices for Rodents" presented at the Proceedings of the 2015 COMSOL conference, pp. 1-7, Boston, USA, Oct. 8-10, 2015.

Badr et al., "Power Transfer via Magnetic Resonant Coupling for Implantable Mice Telemetry Device," presented at 2nd IEEE WPTC, pp. 259-264, Jeju, South Korea, May 8-9, 2014.

Badr et al., "Wireless Power Transfer for Telemetric Devices with Variable Orientation, for Small Rodent Behavior Monitoring," *IEEE Sensors Journal*, 15(4): 2144-2156, Apr. 2015.

Boys et al., "Stability and control of inductively coupled power transfer systems," IEEE Proc. Electr. Power Appl., 147(1): 37-43, Jan. 2000.

Budgett et al., "Novel technology for the provision of power to implantable physiological devices," *Journal of Applied Physiology*, 102(4): 1658-1663, Jan. 11, 2007.

Carta et al., "A wireless power supply system for robotic capsular endoscopes," *Sensors and Actuators A: Physical*, 162(2): 177-183, Jan. 4, 2010.

Cong et al., "A Wireless and Batteryless 10-Bit Implantable Blood Pressure Sensing Microsystem With Adaptive RF Powering for Real-Time Laboratory Mice Monitoring," *IEEE Journal of Solid-State Circuits*, 44(12): 3631-3645, Dec. 11, 2009.

Covic et al., "Self Tuning Pick-ups for Inductive Power Transfer," presented at Power Electronics Specialists Conference, pp. 3489-3494, Rhodes, Greece, Jun. 15-19, 2008.

Dissanayake et al., "Experimental Study of TET System for Implantable Biomedical Devices," *IEEE Transactions on Biomedical Circuits and Systems*, 3(6): 370-379, Oct. 30, 2009.

Gate driver "MIC4421" (May 16, 2014). [Online]. Available: http://www.micrel.com.

Harrison, "Designing Efficient Inductive Power Links for Implantable Devices," *2007 IEEE International Symposium on Circuits and Systems*, 4 pages, May 2007.

Hsu et al., "A Wireless Power Pickup Based on Directional Tuning Control of Magnetic Amplifier," IEEE Trans. Ind. Electron., 56(7): 2771-2781, Jul. 2009.

Hsu et al., "Fuzzy based Directional Tuning Controller for a Wireless Power Pick-up," presented at 10th IEEE TENCON Conference, pp. 1-6, Hyderabad, India, Nov. 19-21, 2008.

Hsu et al., "Fuzzy logic-based directional full-range tuning control of wireless power pickups," Power Electronics, IET, vol. 5, No. 6, pp. 773-781, Sep. 2012.

Hsu et al., "Implicit Adaptive Controller for Wireless Power Pickups," presented at Industrial Electronics and Applications Conference, pp. 514-519, Beijing, Jun. 21-23, 2001.

Hsu et al., "Power Flow Control of a 3-D Wireless Power Pick-up," $2^{nd}$ *IEEE Conference on Industrial Electronics and Applications*, 2172-2177, May 2007.

Hu et al., "Improved Power Flow Control for Contactless Moving Sensor Applications," IEEE Power Electronics Letters, 2(4): 135-138, Dec. 2004.

Huang et al., "LCL Pick-up Circulating Current Controller for Inductive Power Transfer Systems," presented at Energy Conversion Congress and Exposition, pp. 640-646, Atlanta, USA, Sep. 12-16, 2010.

James et al., "A Variable Inductor Based Tuning Method for ICPT Pickups," presented at 7th IEEE IPEC Conference, pp. 1142-1146, Singapore, Nov. 29-Dec. 2, 2005.

Jow et al., "Geometrical Design of a Scalable Overlapping Planar Spiral Coil Array to Generate a Homogeneous Magnetic Field," *IEEE Transactions of Magnetics*, 49(6): 2933-2945, Jun. 2013.

Kilinc et al., "A System for Wireless Power Transfer of Micro-System In-Vivo Implantable in Freely Moving Animals," *IEEE Sensors Journal*, 14(2): 522-532, Feb. 2014.

Kumar et al., "Resonance-based Wireless Power Delivery for Implantable Devices," *2009 IEEE Biomedical Circuits and Systems Conference*, pp. 25-28, Nov. 2009.

Laskovski et al., "Wireless Power Technology for Biomedical Implants," Chapter 7 of *Biomedical Engineering*, pp. 119-132, Oct. 1, 2009.

Lee et al., "An Inductively Powered Scalable 32-Channel Wireless Neural Recording System-on-a-Chip for Neuroscience Applications," *IEEE Transactions on Biomedical Circuits and Systems*, 4(6): 360-372, Dec. 2010.

Mccormick et al., "Powering Implantable Telemetry Devices from Localized Magnetic Fields," *Proceedings of the $29^{th}$ Annual International Conference of the IEEE EMBS*, 2331-2335, Aug. 2007.

Pantic et al., "A New Tri-State-Boost-Based Pickup Topology for Inductive Power Transfer," presented at Energy Conversion Congress and Exposition, pp. 3495-3502, Phoenix, USA, Sep. 17-22, 2011.

Pinuela et al., "Maximising DC to Load Efficiency for Inductive Power Transfer," *IEEE Transactions on Power Electronics*, 28(5): 2437-2447, May 2013.

Ramrakhyani et al., "Design and Optimization of Resonance-Based Efficient Wireless Power Delivery Systems for Biomedical Implants," *IEEE Transactions of Biomedical Circuits and Systems*, 5(1): 48-63, Feb. 2011.

Russell et al., "Wireless power delivery system for mouse telemeter," *2009 IEEE Biomedical Circuits and Systems Conference*, pp. 273-276, Nov. 2009.

Si et al., "A Frequency Control Method for Regulating Wireless Power to Implantable Devices," *IEEE Trans. Biomed. Circuits Syst.*, 2(1): 22-29, Mar. 2008.

Si et al., "Switching Frequency Analysis of Dynamically Detuned ICPT Power Pick-ups," presented at IEEE PowerCon Conference, pp. 1-8, Chongqing, China, Oct. 22-26, 2006.

Soltani et al., "Cellular Inductive Powering System for Weakly-Linked Resonant Rodent Implants," *2013 IEEE Biomedical Circuits and Systems Conference*, pp. 350-353, Oct. 31-Nov. 2, 2013.

Wentz et al., "A wirelessly powered and controlled device for optical neural control of freely-behaving animals," *Journal of Neural Engineering*, 8(4): 10 pages, Jun. 23, 2011.

Xu et al., "A Novel Mat-Based System for Position-Varying Wireless Power Transfer to Biomedical Implants," *IEEE Transactions on Magnetics*, 49(8): 4774-4780, Aug. 2013.

(56) References Cited

OTHER PUBLICATIONS

Xu et al., "Batteries Not Included," *IEEE Microwave Magazine*, pp. 63-72, Mar. 6, 2013.

* cited by examiner

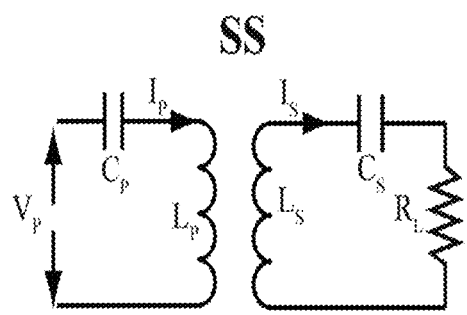
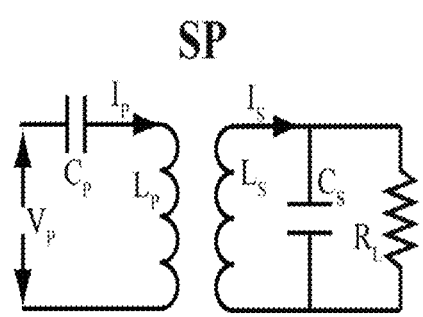
FIG. 3A  FIG. 3B
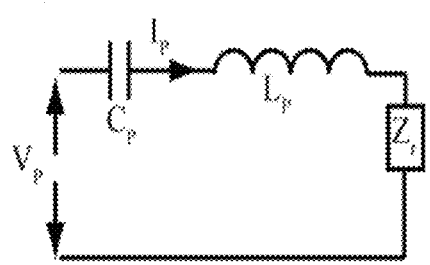
FIG. 3C

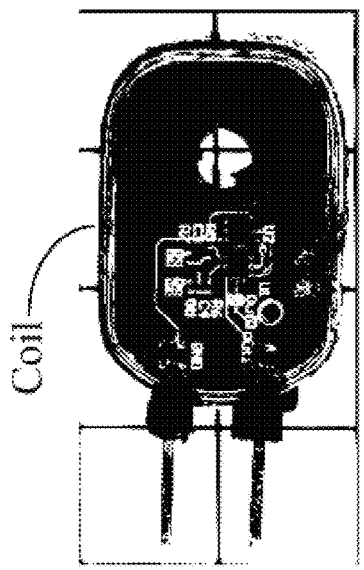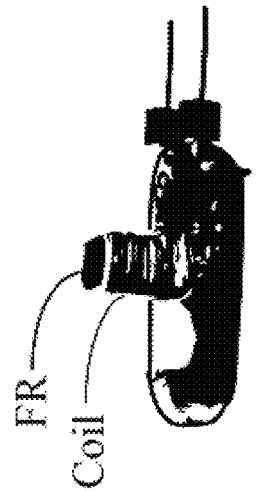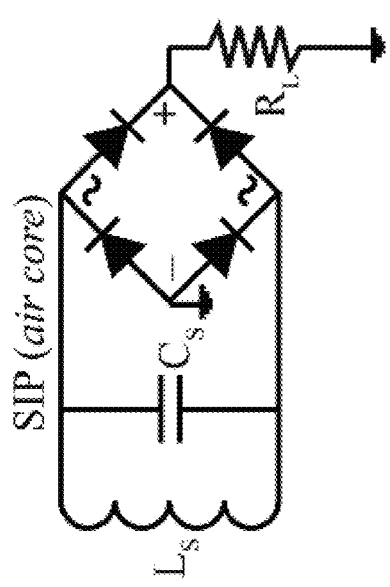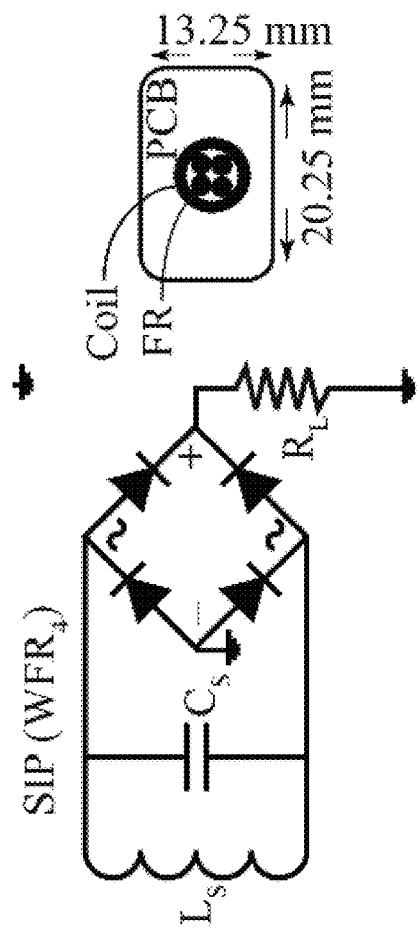
FIG. 5A
FIG. 5B

METHODS AND DEVICES FOR CONTROLLING WIRELESS POWER TRANSFER LEVELS

CROSS REFERENCE TO RELATED APPLICATIONS

This application claims the benefit of U.S. Provisional Patent Application No. 62/327,352, filed on Apr. 25, 2016, and also is a continuation-in-part of co-pending U.S. patent application Ser. No. 14/978,961, filed on Dec. 22, 2015, which in turn claims the benefit of U.S. Provisional Patent Application No. 62/191,187, filed on Jul. 10, 2015, and U.S. Provisional Patent Application No. 62/096,386, filed on Dec. 23, 2014; each of these prior applications is incorporated herein by reference in its entirety.

FIELD

The present disclosure concerns embodiments of devices, systems, and methods for controlling wireless power transfer levels.

BACKGROUND

In recent years, implantable biomedical telemetry devices (implants) have gained much attention for a variety of applications including generating stimulus signals, monitoring the body, and communicating internal vital signs to the outer world. Providing power to these implants is one of the major challenges in designing such systems. Power requirements for implants vary with the application and can range from a few milliwatts to dozens of milliwatts or more. Some implants are battery operated and their application is limited due to the device size, weight, and battery longevity. For applications involving mice, battery size and weight is more problematic for long duration experiments (1 or more days). In some cases, implants use rechargeable batteries, where those systems employ wireless recharging.

A vast majority of the research on neural mechanisms of therapies is currently conducted using rodent models. Implantable biotelemetry systems are effective tools for clinical medicine and also in animal research, because they allow for the acquisition of otherwise unavailable physiological data, such as high quality internal electromyographic (EMG) data, electroencephalogy (EEG) data, motion data, or other data. High-quality data means many sample points per-unit-time, for a high fidelity waveform. For example, an EEG signal is considered acceptable quality with 200 samples/second at minimum, but ideally 2000 samples/second or higher.

Gathering high quality behavioral and biological data from small rodents is important for the study of various disease models in biomedical research. Acquisition of high quality data requires reasonable power for the electronics to sample at such rates, digitize the data, and then transmit it by radio signal. Presently, the largest permissible size/weight battery acceptable for mice would lose power in about 30 minutes if it had to acquire and transmit data at 200 samples/sec. The only way to perform high quality data sampling and transmission for continuous periods of several hours or longer is with a wireless power scheme. In addition, to conduct research with small animals effectively, they must be able to move freely inside their cage. However, the continuously changing orientation of the small animals leads to coupling loss/problems between the primary (transmitter) and secondary (receiver) coils, presenting a major challenge. Furthermore, excess power obtained by good orientation between the primary and secondary coils can include undesirable results, such as device malfunction and tissue damage. Thus, a need exists in the art for devices and systems capable of wireless power transmission for powering the performance requirements for telemetric devices for animal monitoring, including devices and systems that are suitable for monitoring multiple different animals in a single environment and that can control the level of power produced during use.

SUMMARY

Disclosed herein are device embodiments, comprising a coil defining a coil axis; a tank capacitor electrically coupled to the coil and wherein the coil and the tank capacitor define a resonant frequency; a rectifier coupled to the coil so as to receive and rectify an electrical voltage induced in the coil; a switching capacitor electrically coupled to the tank capacitor; and a microcontroller electrically coupled to the switching capacitor so as to tune or detune the resonant frequency established by the coil, the tank capacitor, and the switching capacitor. In some embodiments, the devices can further comprise a ferrite rod having a rod axis and situated to be at least partially proximate to the coil. In some embodiments, the rectifier is a half-wave bridge rectifier. In yet additional embodiments, the rectifier can be electrically coupled to a stimulator component and/or a microprocessor. In some embodiments, the switching capacitor can be coupled in parallel with the tank capacitor. In yet additional embodiments, the switching capacitors is coupled in series with the tank capacitor.

The disclosed device embodiments can further comprise a transistor electrically coupled to the switching capacitor and the microcontroller, wherein the microcontroller is coupled to the switching capacitor so as to tune or detune the resonant frequency. In some embodiments, the microcontroller can be configured to control the one or more switching capacitors by switching the one or more transistors on or off. In some embodiments, the microcontroller includes an analog input configured to adjust a capacitance associated with the switching capacitor. In some embodiments, the devices can further comprise two switching capacitors that are electrically coupled to the microcontroller and the tank capacitor and that can be switched on or off by the microcontroller. In yet additional embodiments, the devices can comprise four switching capacitors, wherein two switching capacitors are configured to tune the device when heat increases due to high induced current, one switching capacitor is configured to tune the device, and one switching capacitor is configured to compensate any decreasing secondary capacitance of the tank capacitor. In some embodiments, the switching capacitor is connected to the transistor such that the switching capacitor is connected to a drain of the transistor and a transistor source is connected to ground.

Also disclosed herein are system embodiments, comprising a primary circuit comprising (i) a primary coil defining a primary coil axis; and (ii) a primary tank capacitor coupled to the primary coil; and a secondary circuit comprising (i) a secondary coil defining a secondary coil axis; (ii) a secondary tank capacitor; wherein the secondary coil and the tank capacitor define a resonant frequency; (iv) a rectifier coupled to the secondary coil so as to receive and rectify an electrical voltage induced in the secondary coil by the primary coil; (v) a switching capacitor electrically coupled to the tank capacitor; and (vi) a microcontroller electrically coupled to the switching capacitor so as to tune or detune a secondary resonant frequency of the secondary circuit with respect to a primary resonant frequency associated with the primary coil and the primary tank capacitor. In some embodiments, the primary circuit further comprises a power supply, a signal generator, a gate driver, an amplifier, or a combination thereof.

Also disclosed herein are embodiments of a method, comprising inducing an oscillating voltage in a secondary circuit with an oscillating electromagnetic field in a primary circuit, wherein the secondary circuit is part of a telemetric device associated with an animal and the primary circuit is part of a cage in which the animal is physically confined; measuring a voltage associated with the oscillating voltage in the secondary circuit with a microcontroller using an analog input; and adjusting a resonant frequency difference between the secondary circuit and the primary circuit based on the measured voltage. In some embodiments, the resonant frequency difference can be adjusted by tuning a resonant frequency of the secondary circuit. In some embodiments, the secondary circuit comprises a switching capacitor that is switched to detune the resonant frequency. In yet additional embodiments, the measured voltage can be a rectified voltage associated with an alternating voltage in the secondary circuit. The resonant frequency difference can be adjusted by adjusting the switching capacitor of the secondary circuit. In some embodiments, the resonant frequency difference can be adjusted by applying a control voltage to a transistor coupled to the switching capacitor. The methods can further comprise electrically coupling the microcontroller so as to adjust the switching capacitor of the secondary circuit so as to adjust the resonant frequency difference. In some embodiments, the resonant frequency difference can be adjusted so as to decrease the measured rectified voltage. In yet additional embodiments, the resonant frequency difference can be adjusted so as to increase the measured rectified voltage.

The foregoing and other features and advantages of the present disclosure will become more apparent from the following detailed description, which proceeds with reference to the accompanying figures.

BRIEF DESCRIPTION OF THE DRAWINGS

FIG. 2A illustrates PP topology and FIG. 2B illustrates the loading effect of the secondary coil back onto the primary circuit.

FIGS. 3A-3C are circuit diagrams illustrating SS (FIG. 3A) and SP (FIG. 3B) topologies of obtaining magnetic resonant coupling between the primary section and the secondary section and illustrating a primary series compensation (FIG. 3C).

FIGS. 5A-5D are device configurations of an air-core (FIG. 5A), WFR$_4$ (FIG. 5B), 4MF (FIG. 5C), and 4MFA (FIG. 5D) where $L_s$ represents the secondary coil and $C_s$ represents the tank capacitor, in all figures.

FIG. 9A illustrates a spherical workspace and FIG. 9B illustrates an arrow plot on single x-z plane, showing normalized magnetic flux density.

FIG. 10A is a plot plotted on the x-y plane within and around the primary coil; FIG. 10B is a plot plotted within the 4MF configuration coil plane and within the ferrite rods.

FIG. 11A is an arrow plot of 4MF at 0° orientation; FIG. 11B is an arrow plot of 4MF at 30° orientation.

FIG. 12A is an arrow plot of 4MFA at 0° orientation; FIG. 12B is an arrow plot of 4MFA at 30°; FIG. 12C is an arrow plot of 4MFA at 60°; and FIG. 12D is an arrow plot of 4MFA at 90°.

DETAILED DESCRIPTION

I. Explanation of Terms

Figure 1:
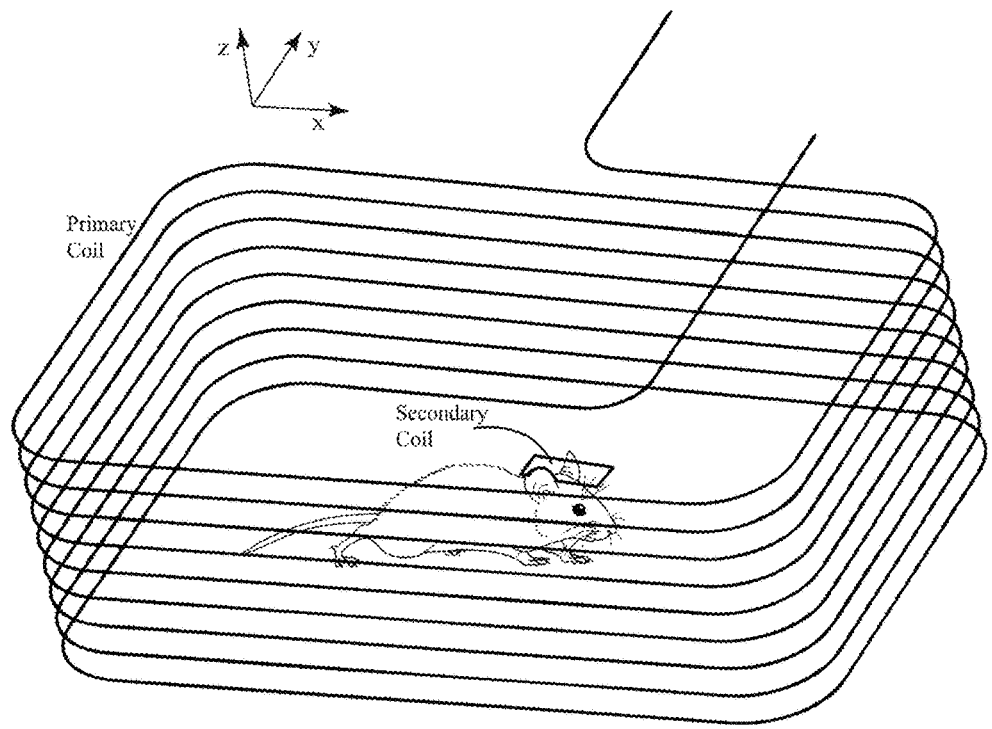
FIG. 1 illustrates an exemplary embodiment of a system for mouse-based telemetry acquisition, where a device embodiment is positioned on the head of a freely moving mouse; in this example, the mouse moves within a stationary primary coil wrapped around a small mouse housing cage sized 250×120×150 mm (length×width×height). The cage size should be selected to meet the minimum animal care standards for mice.

As used in this application and in the claims, the singular forms "a," "an," and "the" include the plural forms unless the context clearly dictates otherwise. Additionally, the term "includes" means "comprises." Further, the term "coupled" does not exclude the presence of intermediate elements between the coupled items and can include being mechanically coupled and/or electrically coupled.

The present disclosure is directed toward all novel and non-obvious features and aspects of the various disclosed embodiments, alone and in various combinations and subcombinations with one another. The disclosed systems, methods, and devices are not limited to any specific aspect or feature or combinations thereof, nor do the disclosed systems, methods, and devices require that any one or more specific advantages be present or problems be solved. Any theories of operation are to facilitate explanation, but the disclosed systems, methods, and devices are not limited to such theories of operation.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed systems, methods, and devices can be used in conjunction with other systems, methods, and apparatus. Additionally, the description sometimes uses terms like "produce" and "provide" to describe the disclosed methods. These terms are high-level abstractions of the actual operations that are performed. The actual operations that correspond to these terms will vary depending on the particular implementation and are readily discernible by one of ordinary skill in the art.

In some examples, values, procedures, or devices are referred to as "lowest," "best," "minimum," or the like. It will be appreciated that such descriptions are intended to indicate that a selection among many used functional alternatives can be made, and such selections need not be better, smaller, or otherwise preferable to other selections.

Examples are described with reference to directions indicated as "above," "below," "upper," "lower," and the like. These terms are used for convenient description, but do not imply any particular spatial orientation.

Unless otherwise indicated, all numbers expressing quantities of components, frequencies, percentages, dimensions, temperatures, times, and so forth, as used in the specification or claims are to be understood as being modified by the term "about." Accordingly, unless otherwise indicated, implicitly or explicitly, the numerical parameters set forth are approximations that can depend on the desired properties sought and/or limits of detection under standard test conditions/methods. When directly and explicitly distinguishing embodiments from discussed prior art, the embodiment numbers are not approximates unless the word "about" is recited. Furthermore, not all alternatives recited herein are equivalents.

To facilitate review of the various embodiments of the disclosure, the following explanations of specific terms and abbreviations are provided:

Tune: To adjust the resonant frequency of a system embodiment described herein to eliminate a resonant frequency mismatch between a primary circuit and a secondary circuit.

Detune: To adjust the resonant frequency of a system embodiment described herein to create a resonant frequency mismatch between a primary circuit and a secondary circuit.

Switching Capacitor: An electronic circuit element that moves charges into and out of a capacitor of a secondary circuit when switches are opened and closed, respectively, by one or more associated transistors.

Microcontroller: A component located on a device described herein that is capable of monitoring power received by the device and then applying an algorithm to tune and/or detune the device's resonant frequency.

Control Protocol: A protocol obtained using a microcontroller algorithm whereby different combinations of switching capacitors are selected such that certain switching capacitors are operative when others are not so as to tune or detune resonant frequency between a primary circuit and a secondary circuit. In some embodiments, a control protocol can be used to match or mismatch a secondary frequency of a secondary circuit to a primary frequency of a primary circuit by controlling the operation of switching capacitors within the secondary circuit.

ABBREVIATIONS

CTD: Closed loop controlled tuning or detuning
ECD: Effective capture diameter
EEG: Electroencephalogy data (which is a measurement of neural activity)
EMG: Electromyographic data (which is a measurement of muscular activity)
ESR: Effective series resistance
FEA: Finite Element Analysis
IPT: Inductive power transfer
LCWPT: Loosely coupled wireless power transfer
MCU: Microcontroller
MOSFET: Metal-oxide semiconductor field-effect transistor
PCB: Printed circuit board
RID: Rodent implant device
WMS: Wireless measurement system
WPT: Wireless power transfer

II. Introduction and WPT Theory

Generally, electrophysiological recording and stimulation requires a dozen or more milliwatts of continuous power for the device, for periods of at least 24 hours, or preferably several weeks. The power requirement is based on biosignal acquisition quality (analog-to-digital bit depth, and sample frequency), stimulation regiments, microcontroller power, and radio transmitter power. Further, the device should be capable of harvesting power while at any orientation, such as any orientation from 0° through 90°, with respect to the cage surface plane.

One conventional technique for WPT, particularly in biomedical implants, is inductive coupling, which was first used to power an artificial heart, and now commonly used in implantable devices. More recently, it has been used for neural activity monitoring and stimulation.

WPT systems should be capable of providing power to devices for long term telemetry acquisition where significant power is used, such as for high sample rates, high data volume, or frequent stimulation regiments. A common characteristic of WPT applications for rodent telemetry acquisition is loose coupling between the primary and secondary coils, which greatly limits power transfer. Loose coupling exists when the telemetric device (receiver coil) is smaller than the primary (transmitter) coil, and where the receiver coil is at some distance away from, and orientation to, the primary coil. To compensate for loose coupling, conventional methods use resonant circuit systems to create boosted voltage/current levels at the secondary coil, even in the presence of low coupling coefficients. Such resonant power transfer, however, is dependent on factors such as the frequency match between the inherent resonant frequency of the primary coil, and the inherent resonant frequency of the secondary coil, as well as the quality factor of the secondary coil, and internal impedance of the secondary coil.

A head-mounted device for mice using resonant RF (radio frequency) WPT has been developed in the field. This device requires a secondary coil wrapped around a ferrite rod. The received energy for this device was 200 mW continuous, with 2 W bursts available when buffered with an adaptive supercapacitor circuit. The primary magnetic field strength (H/I) was 300 A/m. Another device in the field is an air-core (that is, a secondary coil with no ferrite component) WPT device designed for mice roaming on top of primary planar-spiral coils, where each coil was 100×100 mm. The resulting electromagnetic field for this device, however, was not uniform and blind-spots were reported where the secondary coil received insufficient power. A wireless implantable microsystem, also an air-core device (that is a secondary coil with no ferrite component), was developed in the field to capture blood pressure information from a freely moving laboratory mouse, with a 150×250 mm primary, and a received power of 2.5 mW. Another implantable air-core device for a freely moving mouse has been developed to monitor organic compounds, pH and temperature. With this device, a coil tracking system was used to move the primary coil, using a servo-controlled system with two rails (x-axis and y-axis) under the mouse cage. The moving primary coil was 80×80 mm, with a transfer of 1.7 mW to the secondary. Another device in the field is a WPT system consisting of an array of planar-spiral primary coils (100×100 mm) to deliver power to a planar-spiral air-core secondary coil (40×40 mm). The power transfer of this device was 21-225 mW, with a parallel orientation between coils. Another implant device has been disclosed, which also requires a wrapped ferrite secondary coil. This device delivered 20 mW to the arbitrarily oriented secondary, using a system of 24 overlapping primary coils, each of which were 100×100 mm planar-spiral coils. They were selectively switched, providing coverage anywhere over the surface area of 150×300 mm. The peak primary coil current was 4.4 A.

Yet other device embodiments that have been disclosed include the following. One air-core WPT device was used for a rat roaming on primary spiral coils on printed circuit boards. The primary coil was 308×283 mm, consisting of an overlapping (four layers) hexagonal planar-spiral coil array. The maximum power received was 33 mW when the secondary coil was at 90° with respect to the primary coil plane. Also, a model of a secondary with multiple coils (three coils perpendicular to each other wrapped on a single square ferrite core) for rats has been proposed. An air-core device has been designed for rats roaming over a charging pad (primary coil) to deliver 100 mW to a secondary coil, in a parallel orientation. The charging pad was 300×300 mm, with nine coils at resonant frequencies between 97 kHz and 209 kHz, driven by an H-Bridge inverter by a phase locked loop (PLL). Another WPT implant air-core device was used for rats roaming on several planar-spiral primary coils, each 132 mm in diameter. This WPT system used four coils, namely a driver, primary, secondary, and load coil. The secondary coil was a combo of planar-spiral and helical coil, with a 29 mm diameter. The driver and primary coils generated a nearly flat magnetic field that induces 1.3 V for neural stimulation.

Some researchers have proposed or designed a secondary with multiple coils for implantation, to achieve reasonable orientation independence from the primary coil plane. Each coil is ideally orthogonal to the others, and with similar area, or with area on the same order. The volume is 1090 mm$^3$ (air-core) and 480 mm$^3$ (ferrite core). It is 1020 mm$^3$ for air-core. In these multi-coil designs, each coil was connected with its own resonant capacitor, and its own rectifier circuit (or half wave rectifier equivalent). The main problem of a multiple-coil secondary is resonant frequency mismatch between the coils, due to component property variations (i.e., tank capacitors and inductors), and mutual inductance effects between coils. For example, the induced voltage (which can arise from favorable orientation with the primary coil) can create a temperature rise in the secondary circuit, which may affect the secondary capacitor ($C_S$) and lead to a resonant frequency mismatch of the secondary circuit. The resulting high temperature can create problems with the electronic components of the disclosed telemetry devices and can result in implanted devices damaging animal tissue.

The present disclosure concerns embodiments of devices and systems that can address some or all of the deficiencies of conventional WPT devices. The new devices and systems provide improved power transfer performance and power output for data acquisition in small animals. A rectangular-helical primary coil, as shown in FIG. 1, with an approximately uniform internal magnetic field can be used in certain embodiments disclosed herein. Further, ferrite components within the secondary coil can be used to increase the quality factor to improve the coupling at all orientations. In typical examples, a single wound secondary coil is used. This is advantageous since a single-coil winding is not plagued by frequency mismatch with other coils, or mutual inductance from other coils. Further minimal ferrite size leaves volume for on-board electronics, and has reasonable volume as compared to multi-coil designs.

Electromagnetic inductive power transfer (IPT) is a popular technique for wireless power transfer over a short range. This technique is based on two fundamental laws: Ampere's law and Faraday's law. IPT is based on the changing magnetic field that is created due to alternating currents through a primary coil that induce a voltage onto a secondary coil. The resulting magnetic field at the secondary (receiver) coil can be obtained by integrating Biot-Savart's law around the primary (transmitter) loop:

$$H = \frac{I_P}{4\pi} \oint \frac{dl \times r}{r^3} \qquad (1)$$

With respect to Equation (1), $I_P$ is the current applied to the primary (transmitter) coil, and r is the transmission distance. The integration of Biot-Savart's law with respect to the line integral of the wire carrying the current ($I_P$) is:

$$H = \frac{I_P N p \alpha p^2}{2\left(\sqrt{\alpha p^2 + r^2}\right)^3} \qquad (2)$$

With respect to Equation (2), $N_p$ is the number of primary turns, and $a_p$ is the primary coil radius. By Faraday's law, the induced voltage ($V_{ind}$) at the secondary (receiver) coil is given by the rate of change of flux crossing the secondary coil:

$$V_{ind} = N_S \mu_0 A_S j w H \qquad (3)$$

With respect to Equation (3), $N_S$ is the number of secondary turns, $A_S$ is the loop area of the secondary coil, and $\mu_0$ is the permeability of free space. Combining Equations (2) and (3), the induced voltage in the secondary coil can be expressed in terms of the primary current ($I_P$), as:

$$V_{ind} = \frac{N_P N_S \mu_0 A_S \alpha_p^2}{2\left(\sqrt{\alpha_p^2 + r^2}\right)^3} \cdot j w I_p \qquad (4)$$

The coupling coefficient for WPT devices for rodents has been reported at around 1%, and may vary due to secondary to primary coil separation, secondary coil area with respect to primary coil area, and secondary to primary coil axial misalignment. Even if the primary coil encloses the entire volume in which the secondary is present, the coupling coefficient will suffer due to orientation misalignment of the secondary plane with respect to the primary plane. By using magnetic resonant coupling between the primary and secondary coils, coupling can be more strongly established, allowing for reasonable WPT efficiency even in the case of misalignment. The magnetic resonant technique was first proposed by Tesla.

Figure 2A:
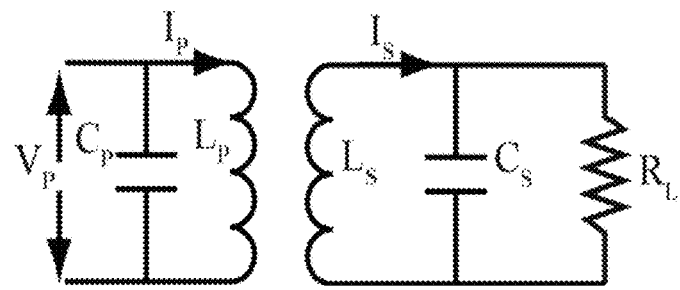
FIGS. 2A and 2B are schematics illustrating parallel-parallel (PP) resonant topology of exemplary primary and secondary coils.

There are four topologies for achieving magnetic resonant coupling between the primary and secondary coils. The topologies are SS, SP, PP, and PS, where the first S or P stands for series or parallel compensation of the primary winding, and the second S or P stands for series or parallel compensation of the secondary winding. In particular embodiments disclosed herein, the PP topology is used, such as shown in FIG. 2A. The efficiency of the PP topology is high for sub-resonant frequencies, since the power transfers at constant current, and therefore provides a larger voltage swing that aids the rectifier circuitry. In additional embodiments, an SS or SP topology can be used, such as that illustrated in FIGS. 3A and 3B. FIG. 3A illustrates an SP topology of primary and secondary coils with FIG. 3C showing primary series compensation.

Figure 2B:
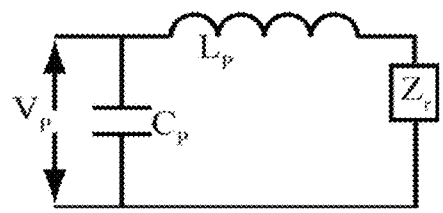

In PP embodiments, the load impedance of the secondary resonator is calculated as a lumped impedance $Z_s$ whose value depends on the secondary parallel compensation as given by Equation (5) below.

$$Z_S = jwL_S + \frac{1}{jwC_S + \frac{1}{R}} \qquad (5)$$

where, w is the radian operating frequency, $R_L$ is load resistance, $L_S$ is the secondary coil, and $C_S$ is the secondary capacitor. The loading effect of the secondary coil back onto the primary circuit is shown in FIG. 2B, as a reflected impedance $Z_r$. It depends on the coupling factor and operating frequency, and it can be written as Equation (6) below.

$$Z_r = \frac{W^2 M^2}{Z_S}, \; M = k\sqrt{L_P L_S} \qquad (6)$$

With reference to Equation (6), M is the mutual inductance between the primary and secondary coils, and k is the coupling coefficient (value between 0 and 1). Substituting Equation (5) into Equation (6), the reflected impedance is obtained using Equation (7) below.

$$Z_r = \frac{W^2 M^2 R}{R^2(w^2 C_S L_S - 1)^2 + w^2 L_S^2} + j\frac{-W^3 M^2 [R^2 C_S (w^2 C_S L_S - 1) + L_S]}{R^2(w^2 C_S L_S - 1)^2 + w^2 L_S^2} \qquad (7)$$

To minimize the VA ratings of the power supply and to achieve magnetic resonant coupling, it is desirable to operate at the zero phase angle of the impedance at the resonant frequency of the load impedance. This zero phase angle of the impedance at the resonant frequency must be achieved to ensure maximum power transfer. The primary capacitance used for PP topology can be obtained by using Equation (8) below.

$$C_P = \frac{L_P - M^2/L_S}{\left(\frac{M^2 R}{L_S^2}\right)^2 + w^2\left(L_P \frac{M^2}{L_S}\right)^2} \qquad (8)$$

The maximum power received by the secondary occurs when the load is conjugately matched. At resonance, the reactive components cancel and the impedance is simply the real component, which is the resistive loss of the secondary tank. For maximum power transfer to occur, the load resistance needs to be equal to the resistive loss of the secondary tank. It is found the optimum value of load resistance ($R_L$) required for maximum power transfer is provided by Equation (9) below.

$$R_L = \frac{R\sqrt{1 + k^2 Q_P Q_S}}{Q_S^2} \qquad (9)$$

With reference to Equation (9), $Q_P$ and $Q_S$ are the quality factor of the primary and secondary coils, respectively. At resonance, the reactive parts in the secondary coil impedance cancel out. The transferred real power via the inductive link is defined as indicated below.

$$P_o = \frac{V_{ind}^2}{R_L} \quad (10)$$

In SP embodiments, the load impedance of the secondary resonator is calculated as a lumped impedance $Z_s$ whose value depends on the secondary parallel compensation as given by Equation (5A) below.

$$Z_S = jwL_S + \frac{1}{jwC_S + \frac{1}{R_L}} \quad (5A)$$

where, w is the radian operating frequency, $R_L$ is load resistance, $L_S$ is the secondary coil, and $C_S$ is the secondary capacitor. The loading effect of the secondary coil back onto the primary circuit is shown in FIG. 2B, as a reflected impedance $Z_r$. It depends on the coupling factor and operating frequency, and it can be written as Equation (6) above. Substituting Equation (5A) into Equation (6), the reflected impedance is obtained as Equation (7A) below.

$$Z_r = \frac{w^2 M^2 R_L}{R_L^2(w^2 C_S L_S - 1)^2 + w^2 L_S^2} + j\frac{-w^3 M^2 [R_L^2 C_S(w^2 C_S L_S - 1) + L_S]}{R_L^2(w^2 C_S L_S - 1)^2 + w^2 L_S^2} \quad (7A)$$

To minimize the VA ratings of the power supply and to achieve magnetic resonant coupling, it is desirable to operate at the zero phase angle of the impedance at the resonant frequency of the load impedance. This zero phase angle of the impedance at the resonant frequency must be achieved to ensure maximum power transfer. The primary capacitance used for SP topology can be obtained by Equation (8A) below.

$$C_P = \frac{1}{w^2(L_P - M^2/L_S)} \quad (8A)$$

The maximum power received by the secondary occurs when the load is conjugately matched. At resonance, the reactive components cancel and the impedance is simply the real component, which is the resistive loss of the secondary tank. For maximum power transfer to occur, the load resistance needs to be equal to the resistive loss of the secondary tank. It is found the optimum value of load resistance ($R_L$) required for maximum power transfer is as described above for Equation (9) and the transferred real power via the inductive link is defined as Equation (10) above.

The present disclosure also concerns methods for actively controlling the resonant frequency of a secondary circuit (e.g., a telemetric device) using on-board closed-loop control to tune and/or detune the resonant frequency. Such embodiments allow for controlling the resonant frequency match between the primary circuit and the secondary circuits in the WPT systems described herein, and particularly in LCWPT systems disclosed herein.

In some embodiments, such disclosed methods of actively controlling resonant frequency provides the ability to control the received power and temperature of the secondary circuit, particularly in scenarios where the secondary coil receives too much power. The described methods also allow for use of multiple secondary circuits within a single primary coil as each secondary circuit can independently tune itself. The ability to do so allows for multiple small animals (each with implants) to be present in a single cage, where that cage is powered by a primary coil. As a result, these methods can be used to monitor multiple freely moving small animals with secondary circuits (e.g., telemetric devices) within the same stationary primary coil.

III. Device and System Embodiments

Disclosed herein are embodiments of wireless power transfer (WPT) systems that can be used to continuously power telemetric devices. The disclosed systems can provide power to the devices for indefinite periods, thereby supplying sufficient power for high quality data collection and transmission for experiments requiring durations of a few hours to a few weeks or more. Such systems thereby obviate the risks associated with surgery typically used to replace batteries, or the risks of transcutaneous wiring.

Disclosed herein are embodiments of devices, comprising a coil defining a coil axis, at least one ferrite rod having a rod axis and situated to be at least partially within a volume defined by the coil or at least partially proximal to the coil, and a receiving component, such as a rectifier, coupled to the coil so as to receive an electrical voltage induced in the coil. In some embodiments, the device comprises a tank capacitor. The coil can also be referred to herein as a secondary coil or receive-coil when used in combination with a primary coil. The at least one ferrite rod can comprise four ferrite rods. The rod axis of the at least one ferrite rod can be at an angle of 0° to 85° relative to the axis of the coil. In some embodiments, the rod axis of the at least one ferrite rod is at an angle of 45°. Some embodiments can comprise more than one ferrite rod and in such embodiments, the ferrite rods can have similar angles with respect to the axis of the secondary coil; that is, each of the ferrite rods can have the same (or substantially the same, wherein substantially means that the angles are within 1 to 10 degrees of each other) angle with respect to the axis of the secondary coil. In some embodiments with more than one ferrite rod, the ferrite rods can have angles that are mirror images with respect to each other (or that form a regular pattern with respect to each other), at specific angles with respect to the axis of the secondary coil. In some embodiments, the at least one ferrite rod is situated proximal to the secondary coil. In some embodiments, the receiving component can receive the electrical voltage induced in the coil and transmit the electrical voltage to a stimulator component, such as electrodes coupled to a subject to be stimulated. In some embodiments, the receiving component can receive the electrical voltage induced in the coil and transmit the electrical voltage so as to produce an electrical stimulus in a subject. In other embodiments, the receiving component receives the electrical voltage induced in the coil and transmits the electrical voltage to a microprocessor.

Some device embodiments can further comprise a rectifier coupled to the combination of the secondary coil and a tank capacitor, so as to rectify the electrical voltage induced in the secondary coil. The rectifier can be a full wave bridge rectifier. In some embodiments, a smoothing capacitor is coupled to the rectifier so as to receive the rectified voltage from the rectifier. In some embodiments, the devices can further comprise a circuit substrate and the coil is secured to the circuit substrate. The coil can be positioned around the perimeter of the circuit substrate. The at least one ferrite rod can be situated so as to extend through the circuit substrate. The ferrite rod can be situated so as to be substantially bisected along a rod axis by the circuit substrate. The coil can have a circular, oval, elliptical, rectangular, regular or irregular polygonal shape. In some embodiments, the ferrite rod has a circular, oval, elliptical, rectangular, regular or irregular polygonal cross section.

The disclosed systems can be used to power a telemetry implant device, such as a rodent implant device (or "RID"), which can act as a stimulator and sensor for a freely moving small animal, such as a rodent. Particular embodiments of the devices disclosed herein are suitable for subcutaneous implantation in a rat, subcutaneous implantation in a mouse, subcutaneous implantation into small animals, and other embodiments are suitable as a head-mounted device for small animals. In particular disclosed embodiments, the receiving component output power ranges from 0 mW to 120 mW, such as 20 mW to 120 mW.

The devices may be used as an implant device, or they can be used as a head-mount device. The devices may be used to provide power to other small portable electronic devices that are in the category of loosely coupled WPT. The device also can further comprise a circuit substrate. The ferrite component can be positioned within boundaries of the circuit substrate. And, the coil can be positioned around the periphery of the circuit substrate.

Also disclosed herein are embodiments of a system, comprising a primary component and a secondary component. In some embodiments, the primary component can comprise a primary coil defining a primary coil axis and a primary tank capacitor. The primary component also can comprise a signal generator that sends a signal to a power amplifier and a power supply that powers a power amplifier, where the power amplifier drives a primary coil. The secondary component can comprise a secondary coil having an axis, a secondary tank capacitor, at least one ferrite component having an axis, and a receiving component coupled to the coil so as to receive power translated from the coil. Also, the secondary component can further comprise a smoothing capacitor. The secondary component typically comprises four ferrite components and in some embodiments these components are angled at 45° relative to the axis of the coil. The coil can be wrapped around a circuit substrate that is modified to house ferrite components within the boundaries of the substrate and the coil.

In some embodiments, the system comprises a secondary component that includes the secondary coil defining a secondary coil axis, a secondary tank capacitor, at least one ferrite rod having a rod axis and situated to be at least partially within a volume defined by the secondary coil, and a receiving component coupled to the secondary coil so as to receive an electrical voltage induced in the secondary coil by the primary coil. The system also can include an amplifier component, a power supply, a signal generator, or any combination thereof. In some embodiments, the amplifier component is coupled to a power supply, which in turn is coupled to a signal generator. The at least one ferrite rod can comprise four ferrite rods. The rod axis of the at least one ferrite rod can be at an angle of 0° to 85° relative to the axis of the secondary coil. In some embodiments, the rod axis of the at least one ferrite rod is at an angle of 45°. Some embodiments can comprise more than one ferrite rod and in such embodiments, the ferrite rods can have similar angles with respect to the axis of the coil. In some embodiments with more than one ferrite rod, the ferrite rods can have angles that are mirror images with respect to each other (or angles that form a regular pattern with respect to each other), at specific angles with respect to the axis of the secondary coil. In some embodiments, the at least one ferrite rod is situated proximal to the secondary coil. The receiving component can receive the electrical voltage induced in the secondary coil by the primary coil and can either transmit the electrical voltage to a stimulator component (e.g., electrodes coupled to a subject to be stimulated) or transmit the electrical voltage so as to produce an electrical stimulus in a subject. In other embodiments, the receiving component receives the electrical voltage induced in the secondary coil by the primary coil and transmits the electrical voltage to a microprocessor.

Some system embodiments can further comprise a rectifier coupled to the combination of the secondary coil and tank capacitor so as to rectify the electrical voltage induced in the secondary coil. The rectifier can be a full wave bridge rectifier, a half-bridge rectifier, or any other suitable rectifier. In some embodiments, such devices further comprise a smoothing capacitor coupled to the rectifier so as to receive the rectified voltage from the rectifier. In some embodiments, the devices can further comprise a circuit substrate and the secondary coil is secured to the circuit substrate. The secondary coil can be positioned around the perimeter of the circuit substrate. The at least one ferrite rod can be situated so as to extend through the circuit substrate. In some embodiments, the ferrite rod can be situated so as to be substantially bisected along a rod axis by the circuit substrate. In some embodiments, the secondary coil has a circular, oval, elliptical, rectangular, regular or irregular polygonal shape. In some embodiments, the ferrite rod has a circular, oval, elliptical, rectangular, regular or irregular polygonal cross section.

In yet additional embodiments, the system can comprise a primary circuit comprising (i) a primary coil defining a primary coil axis; and (ii) a primary tank capacitor coupled to the primary coil; and a secondary circuit comprising (i) a secondary coil defining a secondary coil axis; (ii) a secondary tank capacitor; wherein the secondary coil and the tank capacitor define a resonant frequency; (iv) a rectifier coupled to the secondary coil so as to receive and rectify an electrical voltage induced in the secondary coil by the primary coil; (v) a switching capacitor electrically coupled to the tank capacitor; and (vi) a microcontroller electrically coupled to the switching capacitor so as to tune or detune a secondary resonant frequency of the secondary circuit with respect to a primary resonant frequency associated with the primary coil and the primary tank capacitor. In some embodiments, the primary circuit further comprises a power supply, a signal generator, a gate driver, an amplifier, or a combination thereof. In some additional embodiments, the system can further comprise at least one ferrite rod having a rod axis and situated to be at least partially proximal to the secondary coil. In such embodiments, the secondary coil, the tank capacitor, and the at least one ferrite rod can define a resonant frequency.

In some embodiments, an air-core device, which is a secondary coil encircling a PCB or other substrates without ferrite rods, is used as a secondary configuration embodiment. In some embodiments, this particular embodiment can be used as a comparative device to illustrate the superior performance of other device embodiments disclosed herein. In yet other embodiments, an air-core device can be used in combination with systems and devices described herein that can tune or detune a resonant frequency. In some embodiments, the air-core exhibits low coupling with the primary coil when the air-core coil plane is at high orientations (i.e., oriented beyond 30° relative to the primary coil x-y plane). For particular rodent telemetry applications disclosed herein, such as that illustrated in FIG. 1, the rodent moves freely within the cage. Hence, its orientation and posture are constantly changing, which results in variable coupling and hence high variability in power transfer. In some orientations, coupling achieved by conventional devices or air-core devices can be lost, resulting in system reset. To remedy these problems, embodiments are disclosed herein wherein at least one ferrite component is provided and located at specific locations within the secondary coil to boost the power transfer. The ferrite components disclosed herein can have any suitable shape for inclusion in the device. In some embodiments, the ferrite component can be square, rectangular, spherical, rod-shaped, or the like. In particular embodiments, the ferrite component is an elongated member. To show the effect of using ferrites, four configurations are disclosed, as shown in FIGS. 4A-4D and FIGS. 5A-5D. These embodiments are referred to herein as the air-core, $WFR_4$, 4MF, and 4MFA configurations. To allow for performance comparisons, the latter three configurations use the same volume of ferrite components, with the same ferrite length, and have similar coil inductance values.

A baseline of power transfer is first established with the air-core design. A variation of the air-core employing ferrite components is the 4MF (comprising four medium ferrites) configuration. 4MF is studied to investigate improvements in power transfer from the distributed addition of ferrites. Also, a conventional wrapped ferrite rod pack referred to as $WFR_4$ (comprising four ferrite rods tightly packed together, which are wrapped with a secondary coil) is examined for comparative purposes. The power transfer can be improved with the 4MF configuration, as compared to either the air-core configuration or the $WFR_4$ configuration.

Another issue addressed by the disclosed device embodiments is potential reduced coupling or loss of coupling of the 4MF, $WFR_4$, or air-core configurations at high angular orientations (where the secondary coil plane is beyond 60° with respect to the primary coil plane). At these high orientations, little magnetic flux should pass through the secondary coil plane. To overcome this problem, some device embodiments comprise tilted ferrite components comprising an axis that is angled at 45° with respect to an axis of the secondary coil. This ferrite orientation can be used to improve the capture of magnetic flux at high angular orientations of the coil, as well as reasonably good capture at low angular orientations of the coil. Such embodiments are referred to herein as the 4MFA configuration (comprising four medium angled ferrites). 4MFA can be used to increase the power transfer in comparison to 4MF at high angular orientations. In addition, the 4MFA configuration occupies less volume than 4MF.

The air-core, $WFR_4$, 4MF and 4MFA configurations can be simulated using FEA (Finite Element Analysis). The simulation results show vector plots of the magnetic flux density surrounding these configurations. Magnitude plots of the flux density passing through these configurations at various angular orientations are also disclosed herein. This data is used to determine the total flux that passes through each coil configuration, at each orientation. The FEA simulations are non-resonant models; hence, further analysis beyond calculation of total flux is not warranted. Rather, the simulations provide insight into the effect of ferrite placement and orientation, to help with design of the best configurations.

Each device embodiment disclosed herein can be evaluated by placing the device within the primary coil (FIG. 1). The device can be positioned by using fixtures with variable orientation or by coupling the device to a small animal (e.g., a mouse or rat). Performance is determined by measuring the voltage induced at the secondary, of various configurations, at various angular orientations, with various currents applied to the primary coil. Since particular embodiments employ magnetic resonant coupling between the primary and secondary sections, effects such as frequency matching, impedance matching, and quality factor, can call influence the total power transfer.

Figure 6:
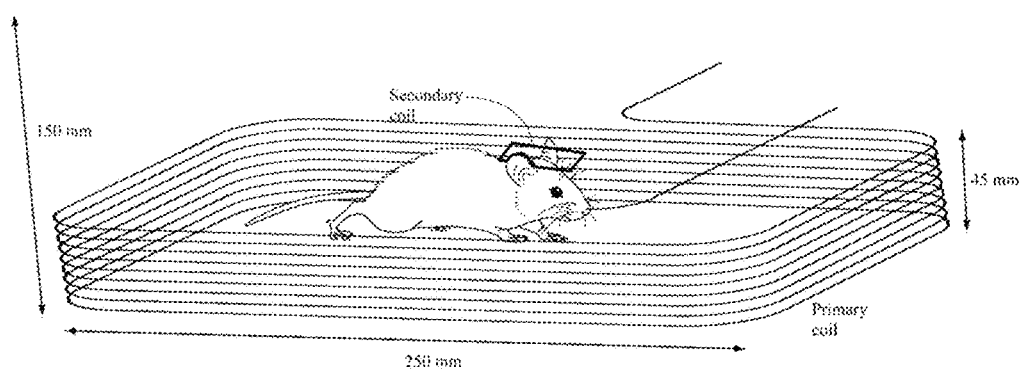
FIG. 6 is an illustration of a representative primary coil whereby each coil winding is separated by a distance from the previous coil winding; the separation distance is 0.5 cm.

Additional cage winding geometries can be used and elucidated using COMSOL simulation tools so as to visualize the electromagnetic flux distribution within the primary coil. Some of these geometries were then constructed and tested, which demonstrated superior quality-factors Q of the primary coil. This in turn leads to increases in system efficiency. The primary coil is a gradual spiral winding around a rectangular prismatic shape. In some embodiments, a separation distance of 0.5 cm between successive windings is selected, as illustrated in FIG. 6. In some embodiments, the separation distance of the windings was 1.5 cm, which can exhibit a lower value for Q.

Also described are different topologies of circuit configuration between a primary coil (transmitter coil, or Tx) and a secondary coil (receive coil, or Rx). In some embodiments, there are four topologies for achieving magnetic resonant coupling between the primary and secondary coils. The topologies are SS, SP, PP, and PS for WPT systems, where the first "S" or "P" stands for series or parallel compensation of the primary coil, and the second "S" or "P" stands for series or parallel compensation of the secondary coil. In some embodiments, the PP topology illustrated in FIG. 2A can be used. In yet other embodiments, a different power amplifier (using the primary winding of FIG. 6) can be used, which is referred to herein as the "S" topology. In such embodiments, an SS or SP topology can be used, which are illustrated in FIGS. 3A and 3B show the new SS and SP topologies, respectively. In particular disclosed embodiments, an SP topology was used to achieve improvements in efficiency, particularly for loosely coupled WPT embodiments, such as those used for small animal monitoring. SP and SS topologies can contribute to improved power transfer efficiency of the systems disclosed herein.

The uniformity of the electromagnetic field within the volume of the primary coil is fairly good. Uniformity of field is one aspect to control in this application, since as the rodent moves from place to place within the coil, variations in received power (due to non-uniformity of the primary field strength) should be kept to a minimum. The new primary coil (FIG. 6) was simulated using COMSOL finite element analysis software. It was observed that the magnetic flux density (in units of Wb) at the center and at the edge of the cage. The magnetic flux density at the center of the cage was found to be $1.5 \times 10^{-4}$ Wb and $9 \times 10^{-4}$ Wb at the edge of the cage, which is very similar (6 times difference) in comparison to other systems. In the z-direction (vertical) the field strengths are also very similar (2-3 times) from top to bottom. Furthermore, the direction of the field is uniformly vertical throughout the volume of the primary coil. This aspect of the system can be used in combination with the other embodiments disclosed herein. Note, in many other "plate or platform" based WPT systems, where those groups use a planar coil (spiral coil in one plane), they have very high fields at the center of their plate, which become much lower toward the edges of their coil (a reverse of our situation). Furthermore, their field also drops off significantly as the height is increased above the plate/platform. This does not occur in the described embodiments.

Figure 7:
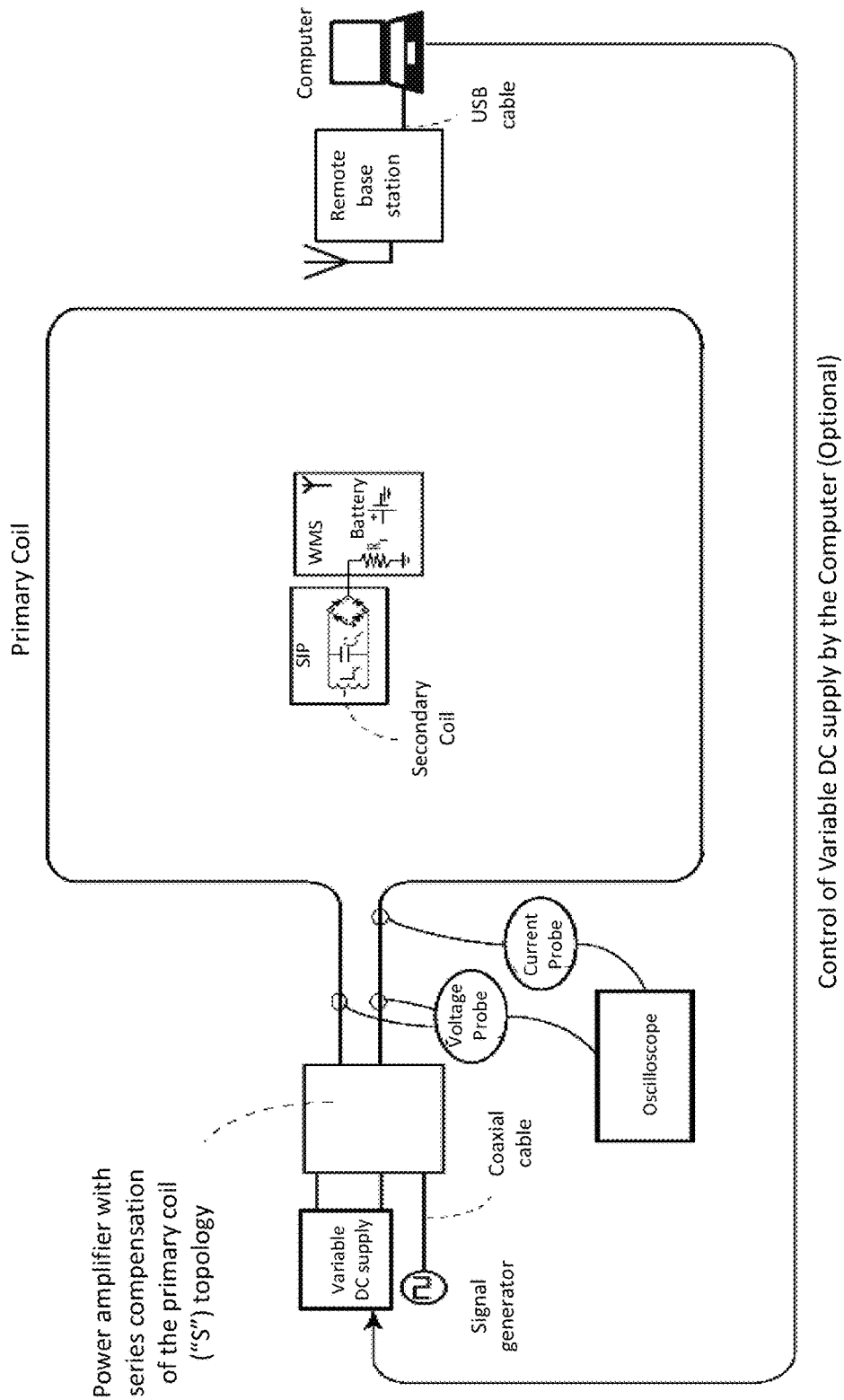
FIG. 7 is a diagram illustrating a representative WPT system.
Figure 8:
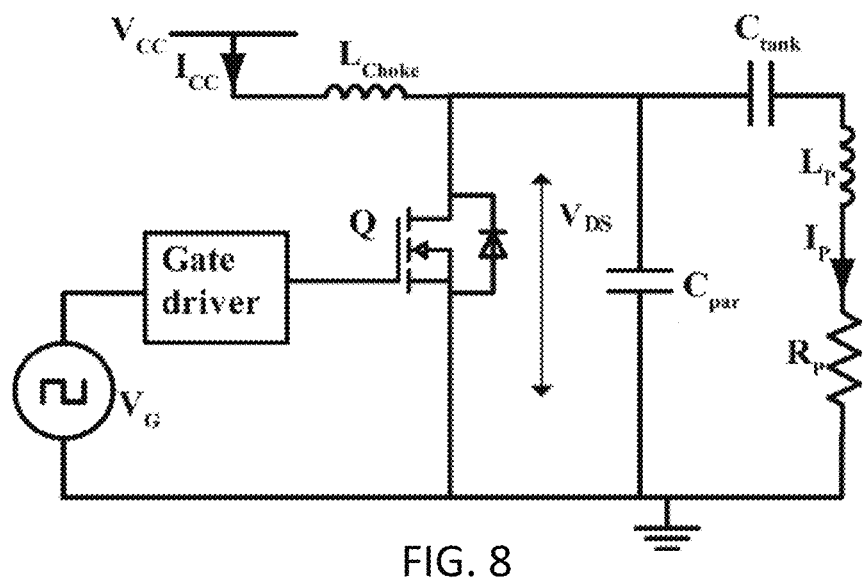
FIG. 8 is a circuit diagram illustrating an embodiment of a Class-E power amplifier design, with an S (series) resonant topology of the primary coil to the primary tank capacitor.

FIG. 7 shows a representative setup of an additional embodiment of the WPT, and FIG. 8 shows the schematic of an additional power amplifier (series compensation, i.e., "S" of the primary coil). When performing this example, an application load, $R_L$ (as shown in FIGS. 3A and 3B) is used, which has a matched impedance value. The induced voltage, the received power, and the power transfer total efficiency ($\eta_{DC\text{-}Load}$) were measured for the air-core configuration. The induced voltage, the received power, and the power transfer total efficiency ($\eta_{DC\text{-}Load}$) were measured for the air-core configuration. The air-core device was placed in the 0° orientation, at the center of the primary coil, and also at the internal edge of the primary coil. A current of 2 A (peak-to-peak) was applied to the primary coil by the power amplifier (as shown in FIG. 8). The induced voltage, the received power and the total efficiency of the air-core configuration at 0° orientation at the center of the cage were: 12.6 V, 32 mW and 2.5%, respectively. The induced voltage, the received power and the total efficiency of the air-core (secondary circuit) at 0° orientation at the edge of the cage were: 18 V, 60 mW and 4.7%, respectively (without ferrites). In embodiments where ferrites are added the power transfer and total efficiencies become higher.

In some embodiments, the devices disclosed herein comprise a coil defining a coil axis, a tank capacitor electrically coupled to the coil (wherein the coil and the tank capacitor define a resonant frequency), a rectifier coupled to the coil so as to receive and rectify an electrical voltage induced in the coil, a switching capacitor electrically coupled to the tank capacitor; and a microcontroller electrically coupled to the switching capacitor so as to tune or detune the resonant frequency established by the coil and the tank capacitor. In some embodiments, the rectifier is electrically coupled to a stimulator component and/or a microprocessor. In some embodiments, the device can further comprise one or more ferrite rods as described herein. The device also can further comprise a transistor electrically coupled to the switching capacitor and the microcontroller, wherein the microcontroller is coupled to the switching capacitor so as to tune or detune the resonant frequency. In some embodiments, the microcontroller is configured to control the one or more switching capacitors by switching the one or more transistors on or off. For example, the microcontroller can include an analog input configured to adjust a capacitance associated with the switching capacitor. Two or more switching capacitors can be electrically coupled to the microcontroller and the tank capacitor; both of these switching capacitors can be switched on or off by the microcontroller. The switching capacitors can be coupled in parallel or in series with the tank capacitor.

In some embodiments, as the small animal moves around inside the volume of the primary coil, there are differences in field strength. These differences translate to different amounts of received power on the secondary coil (implant). Furthermore, as the small animal orients its body at different angles with respect to the primary field (which is basically vertical) the amount of received power on the secondary coil (implant) will vary. Because there is a minimum power needed to keep the implant electronics going, it should receive enough power at the worst-case location in the coil, at a worse case orientation (e.g., 45 degrees). However, when the small animal goes into a more favorable location and/or orientation, it picks up excess power. When this excess power was received in other embodiments, on-board electronics were used to either dissipate the power or clip the voltage, both of which result in generation of heat. On a non-encapsulated device for test, this heat is easily dissipated in air. However, when the device is encapsulated for use in implantation (e.g., with silicone, epoxy, or other encapsulation materials), this excess heat typically cannot be easily dissipated due to the insulative properties of the encapsulating material. Hence the implant components may overheat or encapsulation material can be damaged causing leakage and implant failure. In some embodiments, these issues can be addressed by using the devices described above comprising an MCU that measures the induced voltage at the secondary coil. The MCU can be used to constantly monitor the level of received power on the implant. In some embodiments, an onboard radio also can be used. At the receiver station (shown as a remote base station in FIG. 7), telemetry information from the implant can be received, including received power. The information can be collected and processed in the computer, and forwarded to a PID (proportional integral derivative) controller, which regulates the DC voltage of the power supply (FIG. 7). In this way, the DC voltage that feeds the amplifier can be adjusted as needed and hence the amplitude (intensity) of the magnetic field strength inside the primary coil can be regulated. This evens out the received power in the implant, and prevents overheating/burnout of the implant. This embodiment of controlling overheating can be used in combination with any of the device embodiments disclosed herein. In other examples, amplifier gain is adjusted based on the received power.

In yet additional embodiments, the resonant frequency of the secondary circuit, which typically is the telemetric device used with the subject, such as a small animal (e.g., a mouse or rat), can be tuned and/or detuned using a controller technique described herein so as to match the resonant frequency of the secondary circuit with that of the primary circuit.

IV. Methods of Making and Using Devices and Systems

Also disclosed herein are embodiments of a method, comprising generating an alternating electrical current in a primary coil so as to induce an alternating current in a secondary coil, the secondary coil having a secondary axis, wherein at least one ferrite rod is within a volume defined by the secondary coil; and coupling the alternating current induced in the secondary coil to a tank capacitor, coupled to a rectifier so as to produce a rectified electrical current. In some embodiments, the rectified electrical current is filtered with a smoothing capacitor.

In some embodiments, the method comprises inducing an oscillating voltage in a secondary circuit with an oscillating electromagnetic field in a primary circuit, wherein the secondary circuit is part of a telemetric device associated with an animal and the primary circuit is part of a cage in which the animal is physically confined, measuring a voltage associated with the oscillating voltage in the secondary circuit with a microcontroller using an analog input, and adjusting a resonant frequency difference between the secondary circuit and the primary circuit based on the measured voltage.

In some embodiments, the resonant frequency difference is adjusted by tuning a resonant frequency associated with the primary circuit, by tuning a resonant frequency of the secondary circuit, by adjusting a capacitor coupled to the primary circuit or the secondary circuit, by applying a control voltage to a transistor coupled to the switching capacitor, or a combination thereof. In some embodiments, the secondary circuit comprises a switching capacitor that is switched to detune the resonant frequency. The measured voltage can be a rectified voltage associated with an alternating voltage in the secondary circuit. In some embodiments, a microcontroller can be coupled to the secondary circuit so as to adjust a capacitor coupled to the secondary circuit so as to adjust the resonant frequency difference. In particular embodiments, the resonant frequency difference can be adjusted so as to decrease or increase the measured rectified voltage.

A simulation using 3-D FEA software is done to determine the magnetic field distribution surrounding the various secondary configurations. In particular embodiments, COMSOL FEA software is used, where COMSOL is a commercial FEA package for finding the approximate solution of partial differential equations where the domain boundaries of a given problem are complicated. FEA is used to discretize a physical model into a mesh of elements (subdivisions) and nodes, to find the approximate solutions to the Maxwell's equations that govern the system behavior. Physical models with irregular geometric shapes and multiple materials, such as the configuration models disclosed herein, are well suited for FEA. The entire model is discretized into millions of elements, which are then combined into a set of equations describing the entire system, and these are then solved with the appropriate boundary conditions.

3D FEA can be used to understand how the primary magnetic field interacts with the ferrite components in the secondary coil when the secondary is oriented with respect to the primary field. It also can be used to correlate the total flux captured by the secondary coil to the ferrite component size, shape, and location within the secondary coil. 3D FEA also can be used to help design novel configurations of ferrite-coil combinations suitable for different applications. In some embodiments, a minimal volume of ferrite is used at specific positions within the secondary coil, to maximize the secondary performance at different orientations. In some embodiments, the size of the ferrites was selected to range from 4 mm to 8 mm long, such as 5 mm to 7 mm long, or 6 mm to 7 mm long. The diameter of the ferrites can be selected to range from 1 mm to 3 mm, such as 1.5 mm to 2.5 mm, or 1.5 mm to 2 mm. In particular disclosed embodiments, the size of the ferrites is 6.4 mm long and 1.6 mm in diameter. These ferrite sizes are suitable for the 4MFA configuration (FIG. 5D), and provide a balance between providing sufficient space for onboard PCB electronics (microprocessor, radio, smoothing capacitors, rectifier, and stimulator) while minimizing the overall device volume. The total weight of the 4MFA device configuration is 1.8 g.

Figure 9A:
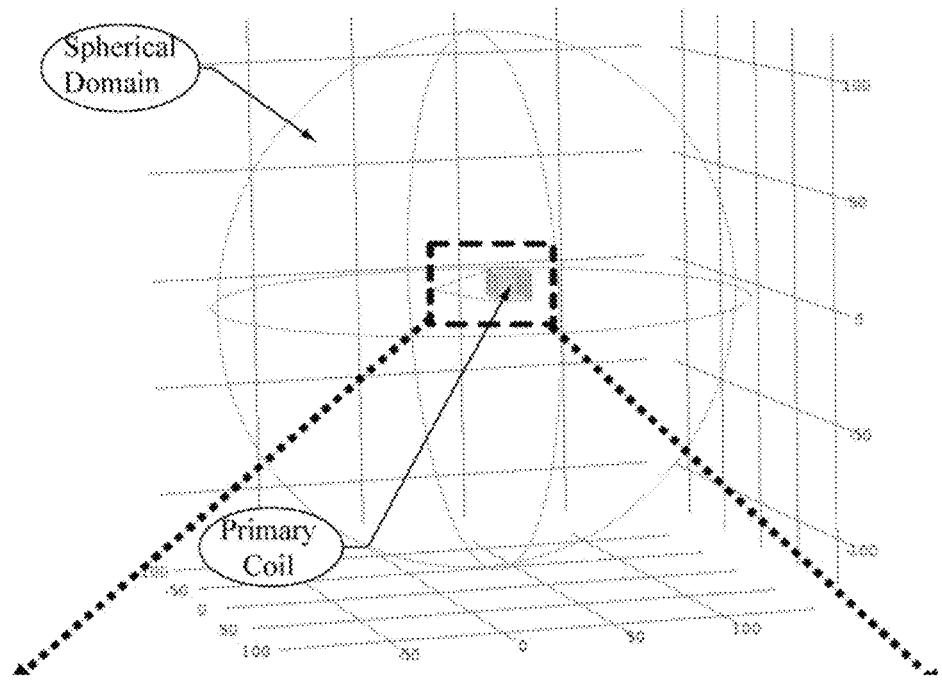
FIGS. 9A and 9B are illustrations of a WPT model in COMSOL.
Figure 9B:
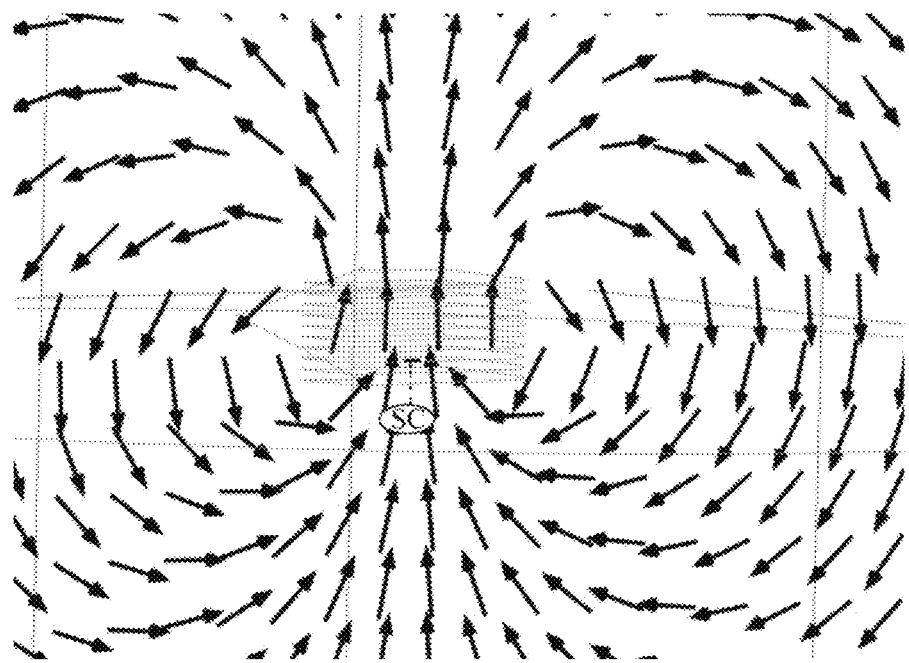

FEA simulation software has been used for plotting the magnetic flux density. The magnetic flux density distribution around (and within) various configurations can be determined. The first simulation done is for the air-core. This consists of a primary coil ($L_p$) that is 25×12×15 cm³ (length×width×height) in size, together with the secondary air-core coil ($L_S$, simplified as one wire loop) that is 13.25× 20.25 mm² in size. Both coils are placed in a spherical domain of radius 120 cm with the properties of air, as shown in FIG. 9A. A Frequency Domain Study is used to investigate the WPT model at an applied frequency, corresponding to the system's resonant frequency. A simulated current of 2.5 A (peak-to-peak) is applied through the primary coil windings. The simulation output is the magnetic flux density at all points in space. A sample plot surrounding the primary coil is shown in FIG. 9B (arrow vectors are normalized, with only the x-z plane plotted for figure clarity).

Figure 4A:
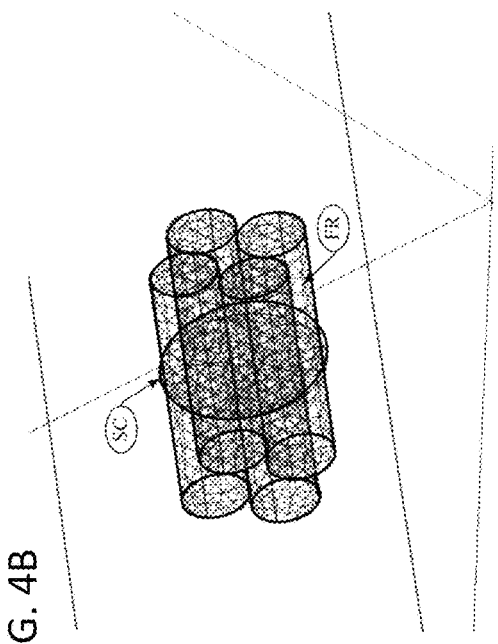
FIGS. 4A-4D are images of the finite element meshing of the secondary coil, which include: air-core (FIG. 4A), WFR$_4$ (FIG. 4B), 4MF (FIG. 4C) and 4MFA (FIG. 4D).
Figure 4B:
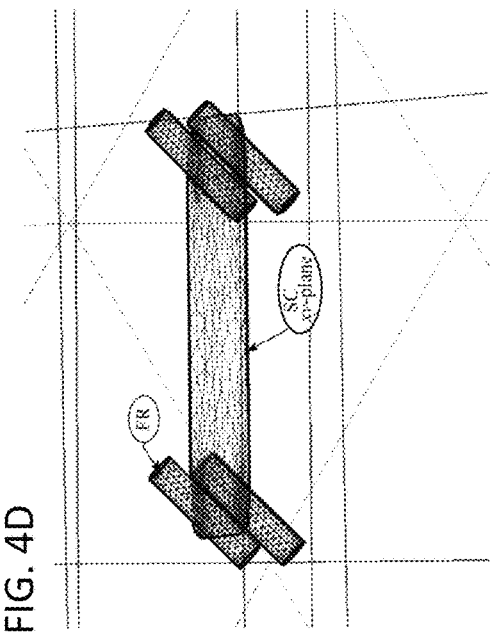
Figure 4C:
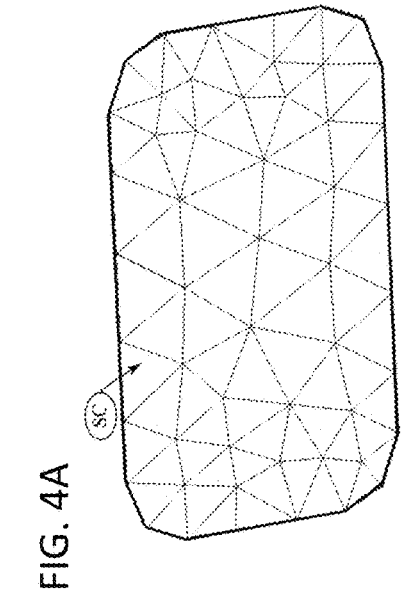
Figure 4D:
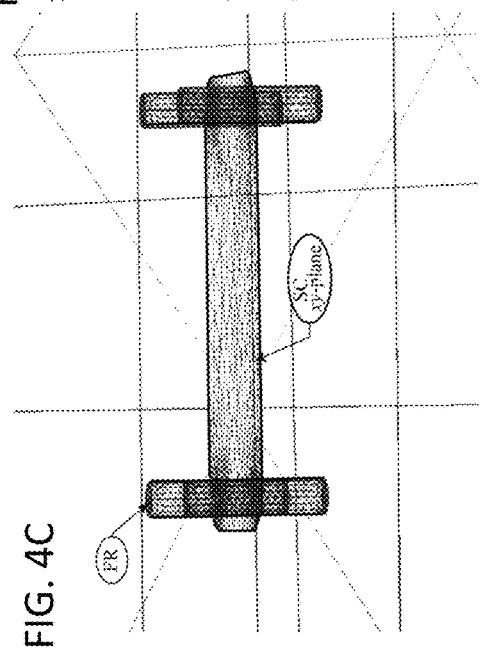

The second simulation is for the $WFR_4$ configuration. This uses the same primary coil ($L_p$), applied current, and spherical workspace, as in the previous simulation. The $WFR_4$ configuration consists of four pieces of ferrite rod (FR) bundled together as shown in FIG. 4B, where each piece is 6.4 mm in length and 1.6 mm in diameter. The secondary coil (SC) is wrapped tightly around the rods ($L_{S-WFR4}$, modeled as a simplified one wire loop). The third and fourth simulations are done for the 4MF and 4MFA configurations, respectively. These also use the same primary coil ($L_p$), applied current, and spherical workspace, as in the previous simulation. The 4MF configuration uses four pieces of ferrite (6.4 mm long and 1.6 mm diameter) placed within the corners of the air-core, as shown in FIG. 4C. The 4MFA configuration consists of the same four pieces of ferrite placed within the corners of the air-core; however, they are tilted at 45° to the secondary coil plane, as shown in FIG. 4D. For both of these embodiments, the secondary coil is wrapped around the 13.25×20.25 mm² PCB ($L_{S-4MF}$ and $L_{S-4MFA}$, each modeled as a simplified one wire loop). In exemplary embodiments, the type of ferrite component used herein was 4B1, which is suitable for the operating frequency of the disclosed WPT system. Its material specifications are configured in COMSOL, including the B-H curve and permeability as a function of frequency.

Figure 10A:
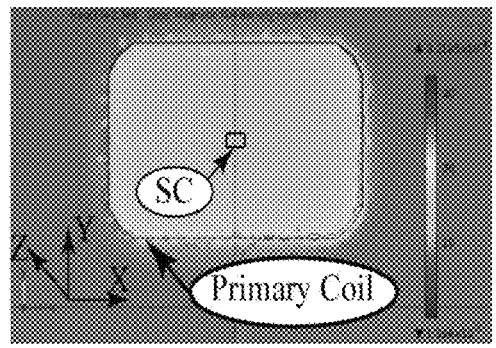
FIGS. 10A and 10B are plots of magnetic flux density.
Figure 10B:
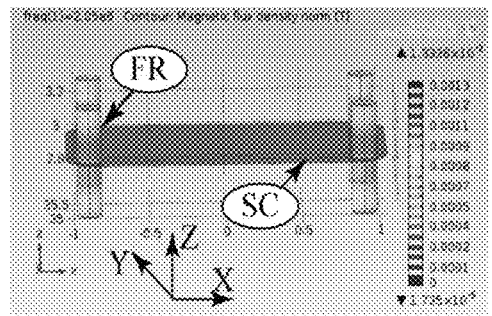

The simulation results demonstrate a significant improvement in the total flux captured when using a secondary coil configuration with ferrite components. The magnetic field is locally attracted by the ferrite, which improves the coupling between the primary and secondary coils. FIGS. 10A and 10B show an x-y plane plot of the magnetic flux density distribution produced by the primary coil, at the middle of the cage. The rectangle labeled "SC" in FIGS. 10A and 10B indicates the location used to simulate the air-core and other configurations, at the 0°, 30°, 60°, 90° orientations. The 3D FEA models developed herein cannot simulate resonant power transfer behavior, which is often needed to provide a direct estimate of power. Instead, flux densities and total flux passing through the secondary coils are obtained and disclosed.

The mutual inductance, $M_{SP}$, between the primary and secondary coils, is defined when a second coil is located such that it captures a portion of the flux generated by the primary coil as:

$$M_{SP} = \frac{\psi_{SP}}{I_P} \quad (11)$$

With reference to Equation (11), $\psi_{SP}$ is the total flux captured by the secondary coil, and $I_P$ is the current flowing through the primary coil. The total flux captured by the secondary coil ($\psi_{SP}$) is given by:

$$\psi_{SP} = \oint B_S I_P dA_S \quad (12)$$

wherein $B_S$ is the flux density crossing perpendicularly through the secondary coil, and $A_S$ is cross section of secondary coil.

Figure 11A:
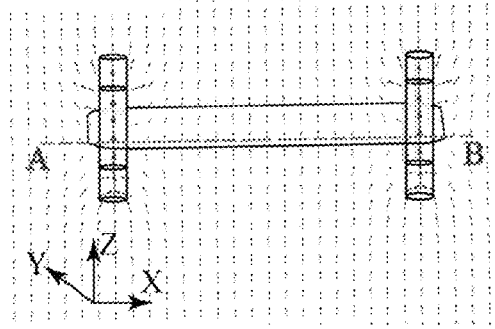
FIGS. 11A and 11B are arrow plots of the magnetic flux density passing through the 4MF configuration wherein the plots are in the x-z plane only.
Figure 11B:
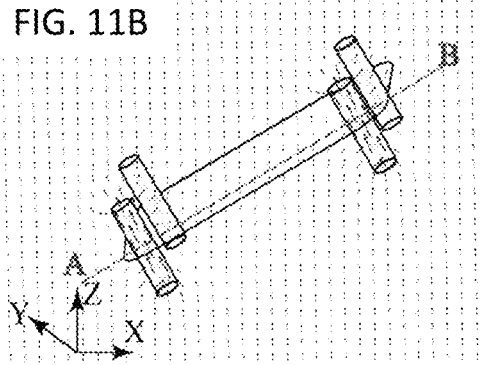
Figure 12A:
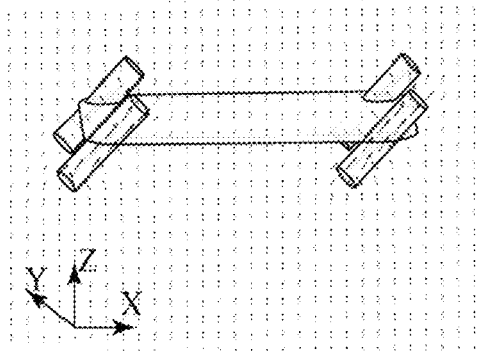
FIGS. 12A-12D are arrow plots of the magnetic flux density passing through the 4MFA configuration wherein plots are in the x-z plane only.
Figure 12B:
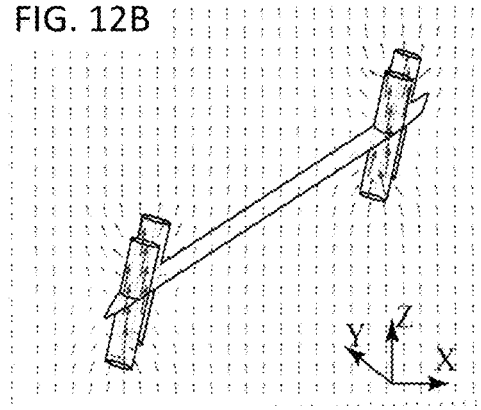
Figure 12C:
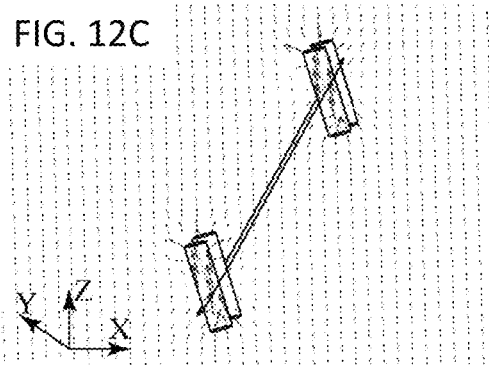
Figure 12D:
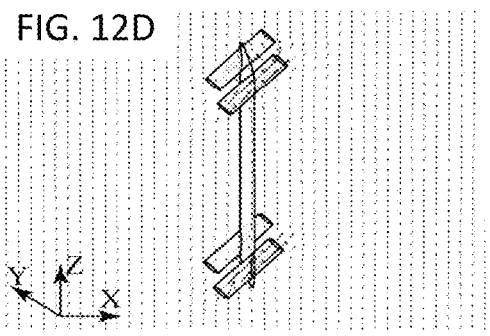

FIGS. 11A and 11B illustrate an arrow plot of the magnetic flux density, passing through the 4MF configuration. The plots are done in the x-z plane, where this particular plane intersects the axis of two ferrite components. The arrow plots are logarithmic, and show the 4MF configuration at 0° and 30° orientations.

Figure 13A:
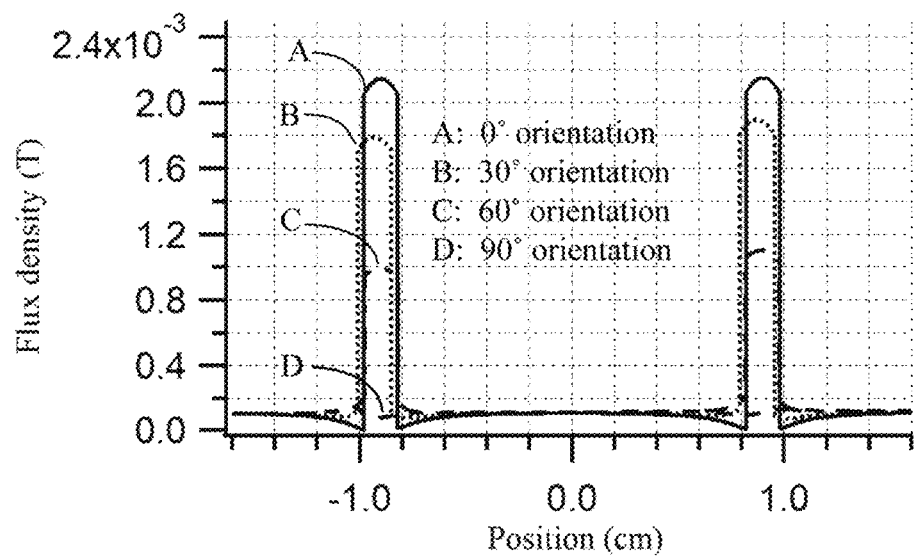
FIGS. 13A and 13B are 4MF (FIG. 13A) and 4MFA (FIG. 13B) plots of the magnetic flux density within the ferrite rods and the air space around them, where they intersect the plane corresponding to the secondary coil windings (coil x-y plane).
Figure 13B:
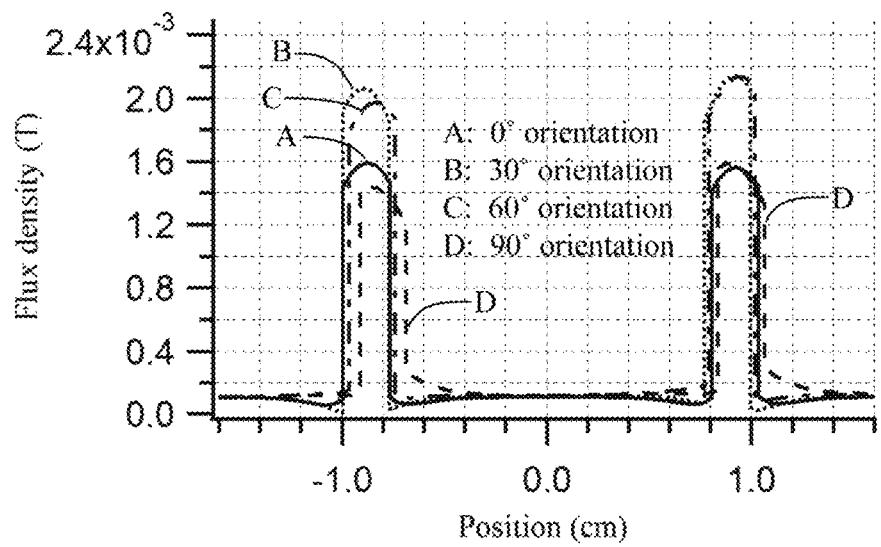

FIGS. 12A-12D illustrates an arrow plot of the magnetic flux density, passing through the 4MFA configuration at the 0°, 30°, 60°, and 90° orientations. The simulation results show that magnetic flux is pulled into the ferrite components from the surrounding space, thereby increasing the flux density inside the ferrite components. Line AB, shown in FIG. 11A, passes through two ferrites on the x-y plane. The magnitude of the flux density crossing the secondary coil, along line AB is then determined, and is plotted in the waterfall plot of FIGS. 13A (4MF) and 13B (4MFA). As seen from FIGS. 13A and 13B, the ambient magnetic field produced by the primary coil is approximately $1.15 \times 10^{-4}$ Wb/m² in locations away from the ferrites. Close to the ferrites, but not within them, the field strength drops to near zero for the 0° and 30° orientations. Without being limited to a single theory of operation, it is currently believed that this field strength drop occurs because the ferrites have consumed the surrounding field near their tips, leaving little flux around them. In this sense, there is an effective capture diameter (ECD) of flux around the tip of the ferrite, where all surrounding flux is drawn in. The ECD is related to the length, volume, shape, and material properties of the ferrite, as well as the ambient field strength. Within the ferrites, the field strength is relatively high. Using the plotted information of FIGS. 13A and 13B and similar plots adjacent to the ferrites, the total flux $\psi_{SP}$ passing perpendicularly through the inside of the secondary coil x-y plane is computed, as listed in Table I.

The results of Table I begin with the nominal case for the air-core secondary (that is, the embodiment with no ferrite components), where the total flux through the coil is only a function of angular orientation. The ambient flux density through the 4MF coil and the 4MFA coil is less than the ambient flux passing through the air-core coil at the 0° orientation. Without being limited to a particular theory of operation, it is currently believed that this occurs since the ferrite ECD starves the field in its vicinity leaving less flux to pass through the air-filled portions of coil. For the case of WFR$_4$, nearly no ambient field is available for the coil, since it is all captured by the ferrites. For the case of 4MF, 4MFA and WFR$_4$, the flux density within a single ferrite component (third column of Table I) is listed. The total flux within all ferrites (fourth column of Table I) crossing normal to the coil is found by the ferrite area×number of ferrites×third column. The total flux (ambient+ferrite) of each configuration is listed in the fifth column of Table I. The 4MF simulation predicts a substantial increase in flux gathered, in comparison to the air-core configuration for the 0°, 30°, and 60° orientations. However, it is near zero at the 90° orientation. The simulation predicts that the 4MFA configuration gathers less flux at the 0° and 30° orientations in comparison to 4MF. However, 4MFA provides improvement at the 60° and 90° orientations in comparison to 4MF, because it can still draw in flux at high orientations. The case of WFR$_4$ is provided as a reference, and demonstrates that the same volume of ferrite, when tightly wrapped by a coil is far less effective than either 4MF or 4MFA, and is not effective at the 90° orientation.

TABLE I

Simulation Results Of Secondary Coil Configurations

| Configuration | Ambient Flux through Coil (Wb) × 10⁻⁸ | Flux Density in Ferrite (Wb/m²) | Total Flux in Four Ferrites (Wb) × 10⁻⁸ | Total Flux $\Psi_{SP}$ in Config (Wb) × 10⁻⁸ |
|---|---|---|---|---|
| Air-core, 0° | 2.95 | 0 | 0 | 2.95 |
| Air-core, 30° | 2.56 | 0 | 0 | 2.56 |
| Air-core, 60° | 1.48 | 0 | 0 | 1.48 |
| Air-core, 90° | 0 | 0 | 0 | 0 |
| 4MF, 0° | 2.37 | 2.20E−03 | 1.77 | 4.14 |
| 4MF, 30° | 2.32 | 1.60E−03 | 1.29 | 3.61 |
| 4MF, 60° | 1.61 | 0.70E−03 | 0.56 | 2.17 |
| 4MF, 90° | 0 | 0 | 0 | 0 |
| 4MFA, 0° | 2.55 | 1.60E−03 | 0.91 | 3.46 |
| 4MFA, 30° | 2.14 | 2.10E−03 | 1.19 | 3.33 |
| 4MFA, 60° | 1.45 | 2.10E−03 | 1.19 | 2.64 |
| 4MFA, 90° | 0 | 1.50E−03 | 0.85 | 0.85 |
| WFR$_4$, 0° | 0 | 1.10E−03 | 0.89 | 0.89 |
| WFR$_4$, 30° | 0 | 0.90E−03 | 0.72 | 0.72 |
| WFR$_4$, 60° | 0 | 0.50E−03 | 0.40 | 0.40 |
| WFR$_4$, 90° | 0 | 0 | 0 | 0 |

The four configurations can be made and tested using embodiments of the disclosed custom designed WPT system. The WPT system can be divided into two parts, namely the primary and secondary components, such as the primary and secondary sections illustrated in FIG. 14. Magnetic resonant coupling is achieved by tuning the primary section such that both sections resonate at the same frequency.

Figure 14:
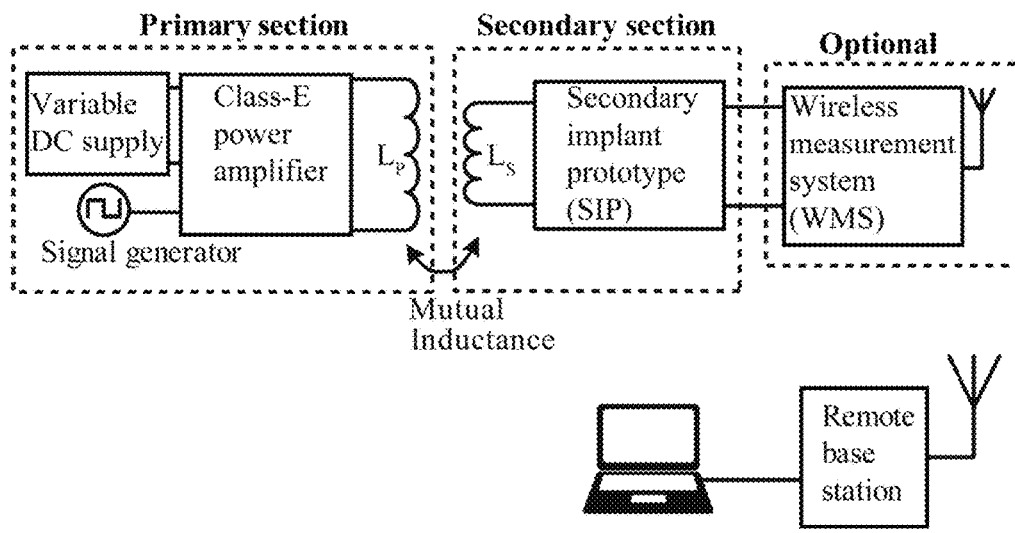
FIG. 14 is a block diagram of a proposed WPT embodiment.

With respect to the embodiment illustrated in FIG. 14, the power is supplied to the primary section using a DC power supply. A signal generator (Agilent 33250A) provides the desired frequency to a Class-E power amplifier, which is used to generate a sinusoidal current ($I_P$) in the primary coil ($L_P$), which in turn generates the electromagnetic field. This alternating field induces a sinusoidal voltage in the secondary coil ($L_S$) of the device, which is rectified into a DC voltage ($V_{ind}$) that powers the application load ($R_L$). In some embodiments, the induced DC voltage $V_{ind}$ can be measured across the load $R_L$, using a custom Wireless Measurement System (WMS). The WMS is powered by battery and communicates via radio to a remote base station connected to a laptop. The WMS wireless data transmission helps the WPT measurements, since it overcomes many problems when using corded oscilloscope probes, to measure the secondary section. In some embodiments, attempts to measure $V_{ind}$ across the load $R_L$ used an oscilloscope via coaxial cable. Some of these measurements, however, exhibited offset and noise problems.

Figure 15:
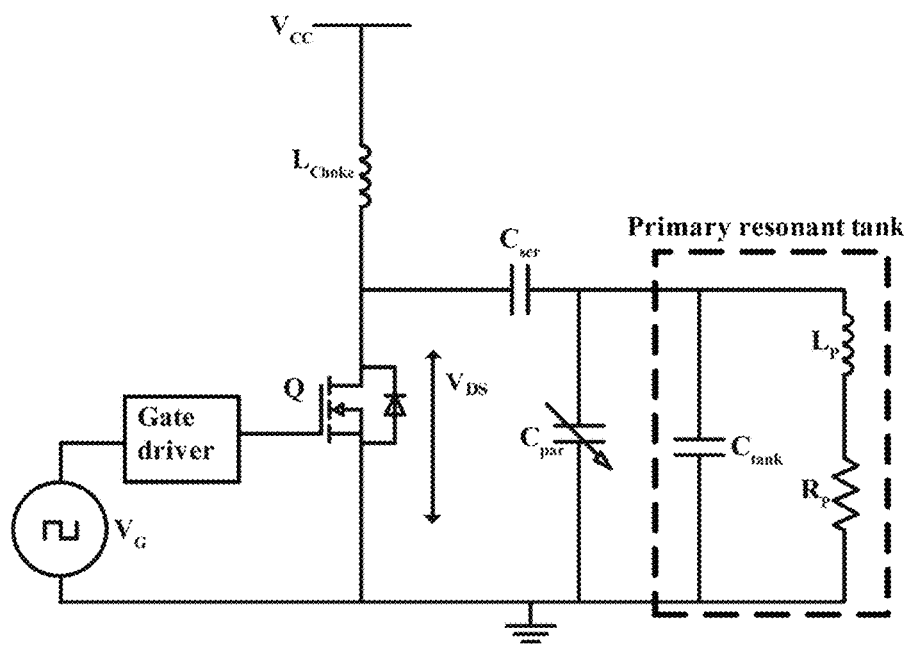
FIG. 15 is a schematic of a Class-E amplifier design with a P (parallel) resonance topology of the primary coil with the primary tank capacitor.

An exemplary Class-E amplifier design used to drive the primary coil ($L_P$) is shown in FIG. 15. The Class-E topology can reduce the stress on the switching element to a minimum. The parallel capacitance normally present in a Class-E amplifier has been replaced here by a diode where the diode allows for suboptimum operation. It also is possible to use other classes of power amplifiers to drive the primary coil.

A pulse train ($V_G$, duty cycle 0.5) is applied at the gate driver (MIC4421). The switch used is a MOSFET (STP16NK65Z), which has high power handling and nanosecond switching capabilities. The power amplifier can deliver a maximum sinusoidal current (peak-to-peak) of 7 A through the primary coil, however, only up to 2.5 A is used in embodiments disclosed herein. This creates sinusoidal voltages (peak-to-peak) of up to 2.3 kV across the primary resonant tank, shown in FIG. 15.

FIGS. 5A-5D show the schematic diagram and cross section of the air-core, WFR$_4$, 4MF and 4MFA configurations, respectively. The rectifier output from each configuration is connected to the load, $R_L$. The secondary coil is wound around the perimeter of the PCB for the air-core, 4MF and 4MFA configurations. For WFR$_4$ the secondary coil is wrapped directly around the ferrites.

To achieve high quality factors, inductors with low effective series resistance (ESR) are required for high frequencies, due to the skin effect and proximity effect. To reduce the ESR, multistrand Litz wires are commonly used. In particular embodiments disclosed herein, the ideal frequency range of operation is 100 kHz to 4 MHz, where no biological effects have been reported. All four configurations of the secondary coil employ 48 AWG Litz wire, where the number of turns used in the air-core, 4MF and 4MFA configurations is 28 turns. The number of turns used in $WFR_4$ is 50 turns. In some embodiments, the device comprises a receiving component that is capable of receiving power from a primary coil through the secondary coil and can either transfer the power to produce a stimulus that affects the test subject or that transfers the power to a microprocessor that is connected to sensors that can be used to measure response from the test subject (e.g., EEG responses).

In some embodiments, the resonant frequency of each configuration is a function of its own LC tank properties and may not be adjustable. The capacitor value can depend on the operating frequency used for resonance. In some embodiments, the secondary LC tank is created by using a fixed 235 pF tank capacitor (CO for all configurations. The coil parameters (Q and $L_s$) of each configuration are listed in Table II, as measured using an HP 4285A LCR meter. The resulting resonant frequency for each configuration is listed in Table III, along with the LC tank impedance, which are measured using an HP 4193A Vector Impedance Meter.

TABLE II

Parameters of the secondary coil of Device configurations

| Configuration | Q | L (µH) |
|---|---|---|
| Air-core | 36 | 22.4 |
| $WFR_4$ | 51.3 | 25.7 |
| 4MF | 44 | 29.5 |
| 4MFA | 44.3 | 26.8 |

The impedance matching within the device must be designed appropriately to avoid internally reflected power loss from the secondary load $R_L$ to the secondary LC tank. The rectifier in the device exhibits impedance with a resistive and reactive part. The reactive part (capacitive component) of this load impedance can be considered as part of the tank impedance of the secondary section. Maximum power will flow when the resistive component of the load $R_L$ is conjugately matched, as explained by Equation (9). The experimental measurements make use of a conjugately matched load $R_L$ to ensure the maximum power transfer for the overall system.

TABLE III

Measured resonant frequency and the impedance magnitude of device configurations

| Configuration | $F_{res}$ (MHz) | $R_{LC}$ (kΩ) |
|---|---|---|
| Air-core | 2.302 | 10.1 |
| $WFR_4$ | 2.101 | 12.3 |
| 4MF | 2.057 | 12 |
| 4MFA | 2.104 | 11.5 |

Figure 16:
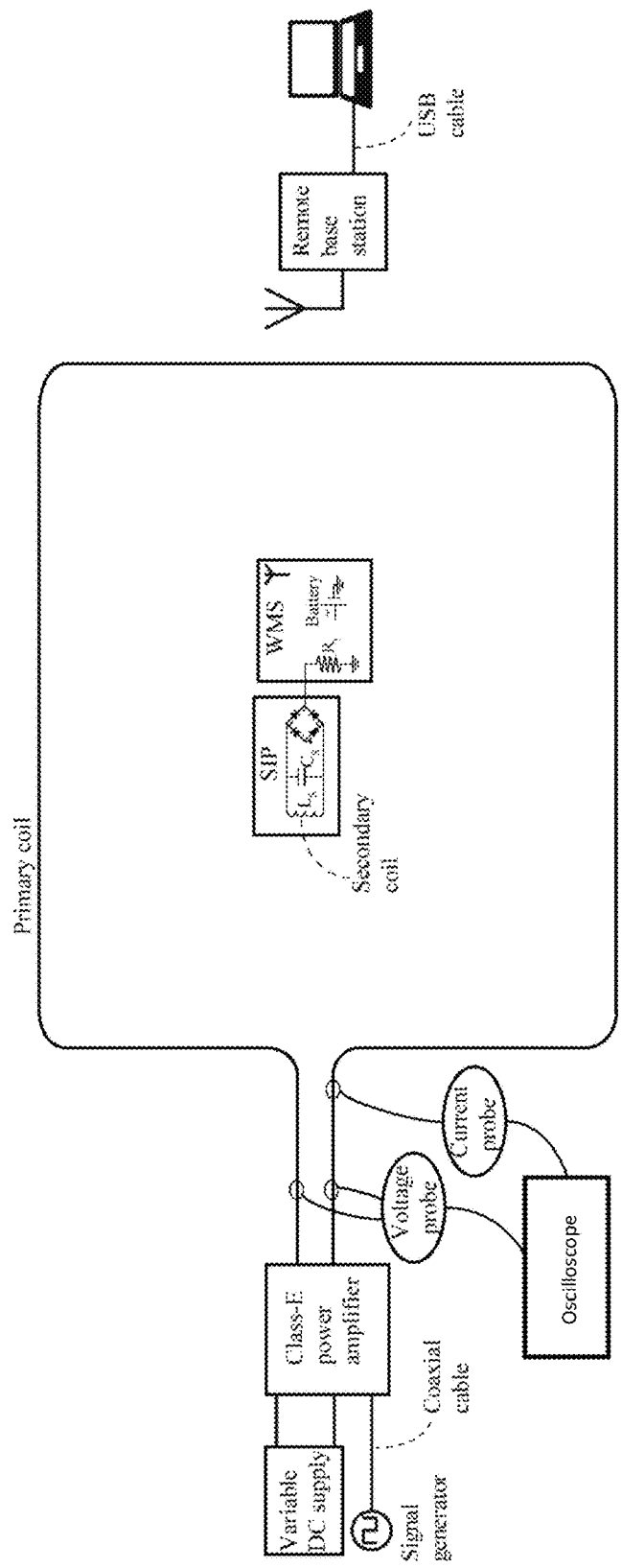
FIG. 16 shows an exemplary WPT experiment setup.

For particular WPT experiments, the primary coil can be wound around a small animal cage, such as is illustrated in FIG. 1. In some embodiments, four experimental fixtures were constructed to hold the device at various orientations (0°, 30°, 60°, and 90° with respect to the x-y plane of FIG. 1) to simulate the angular orientations of a rodent. Each fixture holds the device at a 3 cm height above the base of the cage, at the center of the cage. FIG. 16 shows an exemplary experimental setup of a WPT system embodiment. The output voltage of the Class-E power amplifier is measured by a high voltage probe and the primary current ($I_P$) is measured by a current probe (Agilent N2893A). The high voltage and current probes are connected to the oscilloscope, as shown in FIG. 16. Prior to each WPT experiment, a calibration procedure is done to ensure resonant coupling between the primary and secondary.

Particular embodiments using the four exemplary configurations disclosed herein were conducted to measure the power transfer between the primary and secondary sections. In some embodiments, two independent parameters were varied: the device orientation (0°, 30°, 60°, and 90° with respect to the x-y plane), and the current ($I_p$) applied to the primary coil (1, 1.5, 2 and 2.5 A peak-to-peak sinusoidal). The resulting voltage induced $V_{ind}$ in the secondary device was measured by the WMS.

Figure 17:
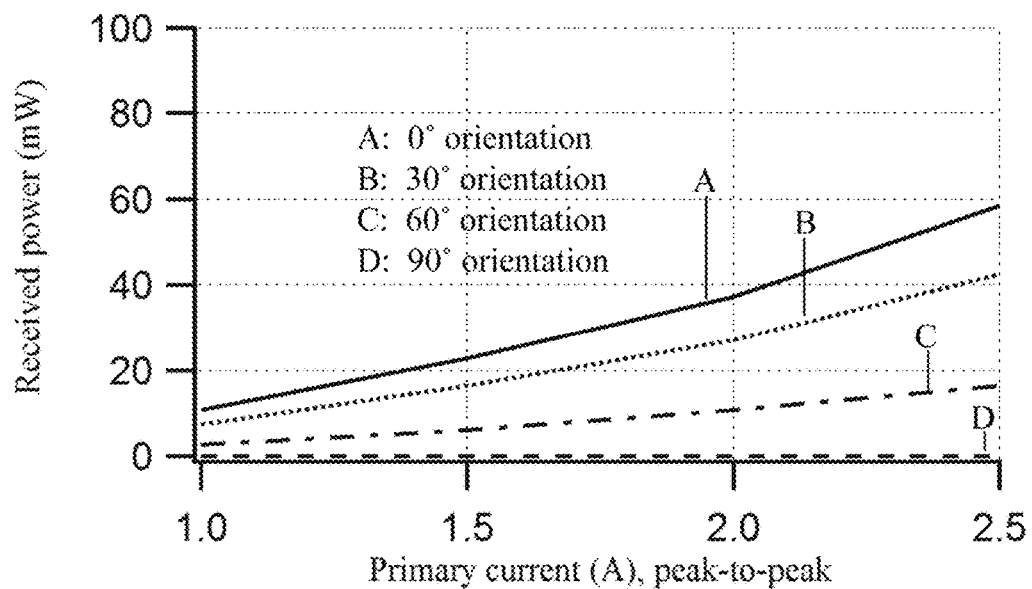
FIG. 17 is a graph of received power (mW) as a function of primary current (A) illustrating the power received in the air-core configuration at the middle of the cage, with a 5 KΩ load $R_L$, for several orientations of the air-core configuration.

FIG. 17 shows a plot of the power transferred to the air-core configuration, when it is located at the middle of the primary cage. The air-core uses a $R_L$ value of 5 kΩ, to achieve impedance matching within the device itself. The induced voltage $V_{ind}$ is measured across $R_L$ by the WMS, and the values are recorded in Table IV. Those $V_{ind}$ values together with $R_L$ are used to create the received power plot of FIG. 17. The maximum power received is 58.4 mW, which occurs at a 0° orientation, with an applied primary coil current ($I_p$) of 2.5 A.

The results of the air-core configuration are expected. As the applied primary current increases, $V_{ind}$ increases, leading to higher power transfer. As the orientation of the secondary increases beyond 0°, coupling is reduced, leading to lower $V_{ind}$, which becomes very small when θ≈90°. The power transfer could be further increased, by increasing the primary coil current, $I_p$, until the ferrites become saturated. This is possible as long as the DC power supply has sufficient power, the parameter $V_{DS}$ (FIG. 15) stays within its breakdown voltage, and the primary coil voltage and current are safe.

Figure 18:
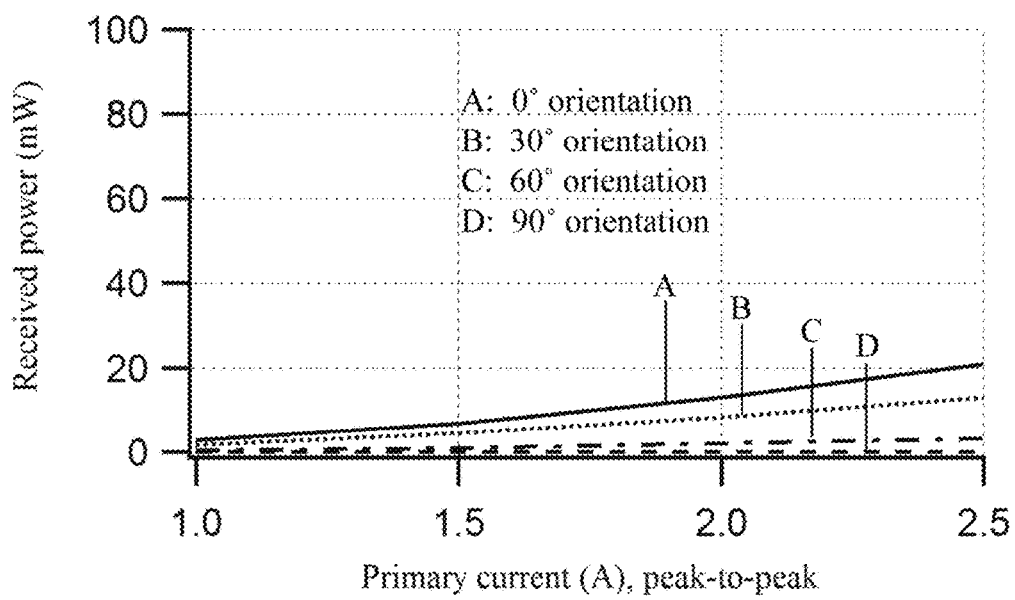
FIG. 18 is a graph of received power (mW) as a function of primary current (A) illustrating the power received in the WFR$_4$ configuration at the middle of the cage, with a 5 KΩ load $R_L$ for several orientations of the WFR$_4$ configuration.

FIG. 18 shows a plot of the power transferred to the $WFR_4$ configuration at the middle of the primary cage. $WFR_4$ uses a $R_L$ value of 5 kΩ to achieve impedance matching within the device. $V_{ind}$ is measured across $R_L$, and is recorded in Table IV. The maximum power received is 20.8 mW, which occurs at the 0° orientation with a primary coil current ($I_p$) of 2.5 A.

Figure 5C:
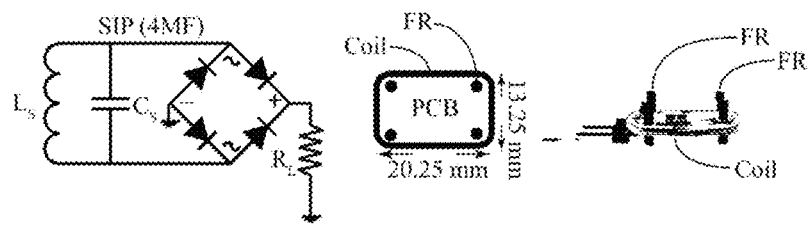
Figure 19:
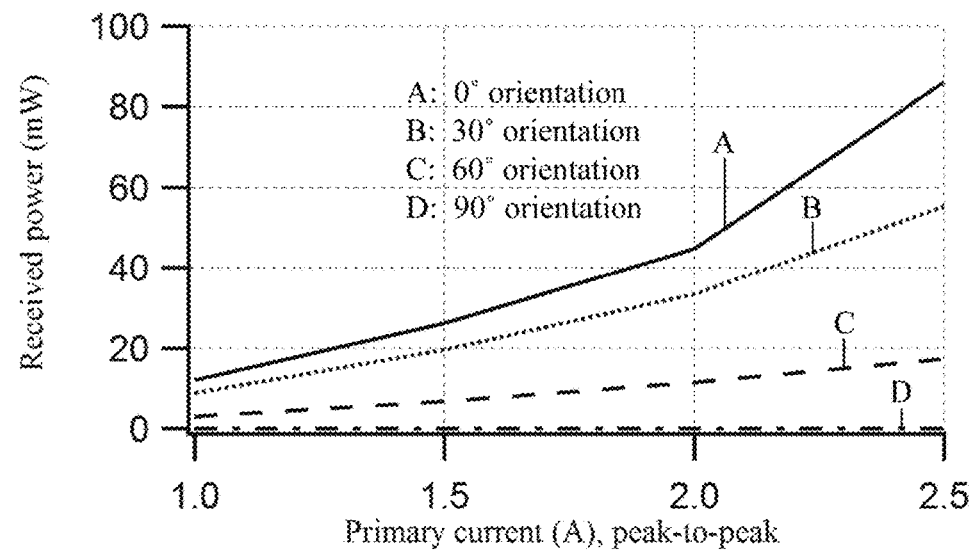
FIG. 19 is a graph of received power (mW) as a function of primary current (A) illustrating the power received in the 4MF configuration at the middle of the cage, with a 10 KΩ load $R_L$ for several orientations of the 4MF configuration.

FIG. 19 shows a plot of the power transferred to the 4MF configuration at the middle of the primary cage. The 4MF configuration uses a $R_L$ value of 10 kΩ to achieve impedance matching within the device. $V_{ind}$ is measured across $R_L$, and is recorded in Table IV. The maximum power received is 86 mW, which occurs at the 0° orientation, with a primary coil current ($I_p$) of 2.5 A. The 4MF configuration differs from the air-core due to the four ferrite components placed perpendicular to the PCB, as shown in FIG. 5C. Recall that the FEA simulations predict that 4MF picks up more flux at all orientations, compared to the air-core. The results confirm an increase in the received power at all orientation. However, in some embodiments, the 4MF configuration is not effective at the 90° orientation, where the received power is only 1 mW.

Figure 5D:
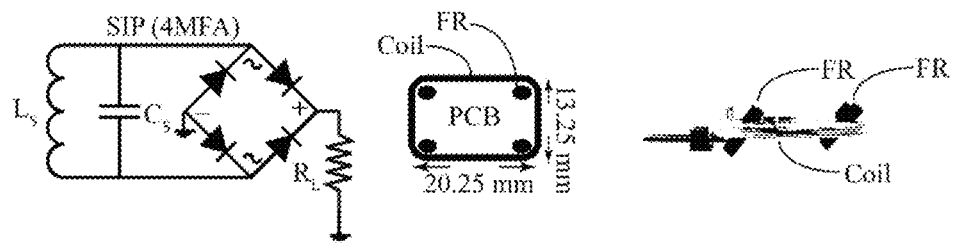
Figure 20:
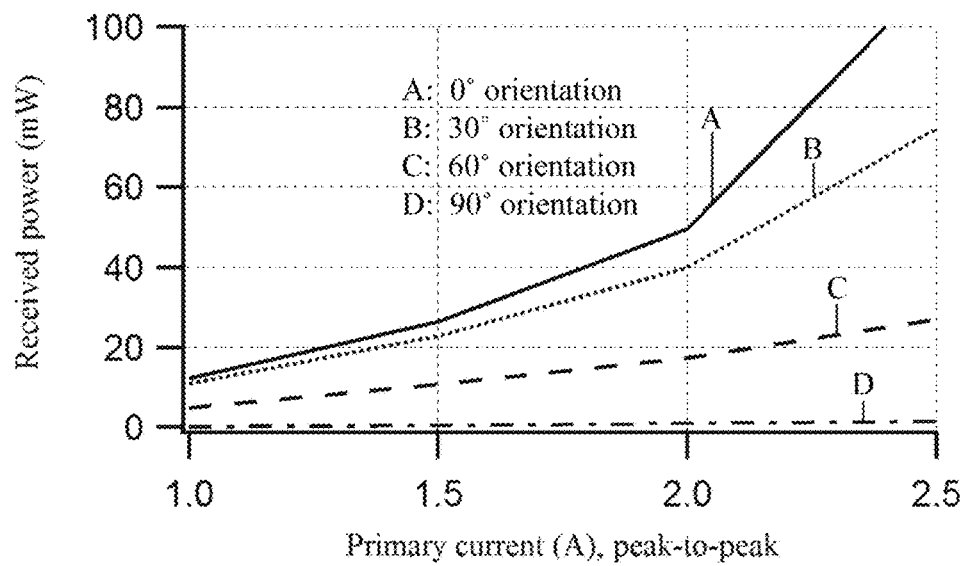
FIG. 20 is a graph of received power (mW) as a function of primary current (A) illustrating the power received in the 4MFA configuration at the middle of the cage, with a 10 KΩ load $R_L$ for several orientations of the 4MFA configuration.

FIG. 20 shows a plot of the power transferred to the 4MFA configuration at the middle of the primary cage. The 4MFA configuration uses a $R_L$ value of 10 kΩ to achieve impedance matching within the device. $V_{ind}$ is measured across $R_L$, and is recorded in Table IV. The maximum power received is 113 mW, which occurs at the 0° orientation, with a primary coil current ($I_p$) of 2.5 A. 4MFA has tilted (45°) ferrite components located at the edges of the PCB, as shown in FIG. 5D. It can be seen that the power collected by 4MFA is higher than the 4MF configuration at all orientations, yet it uses the same size secondary coil with similar L and Q properties as listed in Table II, and the same size and volume of ferrites. The angularity of the ferrite components at 45° demonstrates an improvement in coupling. Even at the 90° orientation, the power received by 4MFA is 1.7 mW (with $I_p$ of 2.5 A), where all other configurations collected near zero power. The FEA simulation results predict that 4MFA would have a flatter spread of collected flux at the 0°, 30°, and 60° orientations, as shown in Table I. This flatter trend can be observed in the $V_{ind}$ data of Table IV, at these orientations.

TABLE IV

Induced voltage $V_{ind}$ measured on the device across load $R_L$

| Configuration | 1.0 A primary current (V) | 1.5 A primary current (V) | 2.0 A primary current (V) | 2.5 A primary current (V) |
|---|---|---|---|---|
| Air-core, 0° | 7.3 | 10.6 | 13 | 17.1 |
| Air-core, 30° | 6 | 9 | 11.6 | 14.6 |
| Air-core, 60° | 3.7 | 5.5 | 7.3 | 9.1 |
| Air-core, 90° | 0 | 0 | 0 | 0.14 |
| 4MF, 0° | 10.9 | 16.2 | 21.1 | 29.3 |
| 4MF, 30° | 9.4 | 13.9 | 18.3 | 23.5 |
| 4MF, 60° | 5.6 | 8.2 | 10.7 | 13.1 |
| 4MF, 90° | 0 | 0 | 0.14 | 0.32 |
| 4MFA, 0° | 11.1 | 16.3 | 22.2 | 33.6 |
| 4MFA, 30° | 10.5 | 15.1 | 19.9 | 27.3 |
| 4MFA, 60° | 7.1 | 10.4 | 13.2 | 16.2 |

TABLE IV

Induced voltage $V_{ind}$ measured on the device across load $R_L$

| Configuration | 1.0 A primary current (V) | 1.5 A primary current (V) | 2.0 A primary current (V) | 2.5 A primary current (V) |
|---|---|---|---|---|
| 4MFA, 90° | 1.2 | 2.3 | 3.3 | 4.1 |
| WFR$_4$, 0° | 3.7 | 5.8 | 8.1 | 10.2 |
| WFR$_4$, 30° | 2.9 | 4.7 | 6.4 | 8.1 |
| WFR$_4$, 60° | 1.2 | 2.1 | 3.2 | 4 |
| WFR$_4$, 90° | 0 | 0 | 0 | 0.26 |

Improvements in wireless power transfer between the primary and secondary coils have been observed when using a small volume of ferrite components within the secondary coil at specific locations. This can be seen in the simulation results of Table I, and also the experimental results of Table IV and FIGS. 17-20.

The 4MF configuration shows a clear improvement in power transfer as compared to the air-core configuration. The ability of the air-core coil to harvest magnetic flux is directly proportional to the coil area through which the primary field passes, which defines the induced voltage $V_{ind}$ in the secondary. Addition of ferrites draws more flux into the coil, resulting in improved coupling and hence power transfer.

Given that both the 4MF and WFR$_4$ configurations use the same volume of ferrite material, and have similar coil properties (L and Q), it is noteworthy to observe that 4MF is far more effective at power transfer than WFR$_4$ at all orientations. The conventional practice in the literature is to tightly wrap the windings around the ferrite for most WPT applications as is done with WFR$_4$; however, the 4MF configuration is more effective for WPT. This difference may be because of any one or more of the following reasons. First, the coil winding area of 4MF is larger at 13.25×20.15 mm$^2$ than WFR$_4$, so extra ambient flux can be captured, as listed in Table I. Second, the ferrite components have an effective capture diameter (ECD). Since they are placed close to the corners of the 4MF coil windings, this allows them to pull magnetic flux into the coil from further beyond the coil. This effectively increases the coil area to a much larger size. The ECD is estimated as 9 mm in certain embodiments, but can vary for different shapes and properties of ferrite, as well as primary field strength. The ECD size can be visualized with the FEA simulations, as shown in FIG. 11A. In some embodiments, four ferrites were used since their ECD areas overlap inside the coil, and hence the four ferrites consume most of the internal field. In particular embodiments, adding more ferrite components within 4MF yields very little additional gain. Third, corner placement of the ferrite components can be used and can exhibit superior performance as compared to that obtained when they are placed in the center of the secondary coil. The distance between the ferrite components themselves is governed by the ECD. If two ferrite components are placed too close together, such as for WFR$_4$, they will compete for the same flux, and hence will reduce their effectiveness. This only holds true as long as the ferrites are not saturated. If the ferrites become saturated, they can be placed closer together. Fourth, the length of the ferrite components (in addition to corner placement) also plays an important factor for collecting flux at orientations beyond 0°, such as between 0° and 90°. The maximum length of the ferrite components becomes a design compromise between the device total volume and power transfer. However, though 4MF is more effective at power transfer than WFR$_4$, both are not effective at orientations that approach 90°.

To improve the performance of the 4MF configuration at high orientations, the 4MFA configuration was created by tilting the ferrites at 45° with respect to the axis of the secondary coil. It is observed that 4MFA will increase the power transfer in comparison to 4MF at all angular orientations. The motivation to tilt the ferrites was to allow them to draw flux through the secondary coil, even when the secondary coil is oriented at 90° to the primary magnetic field. This can be observed in the simulation of FIG. 12D. Further, Table IV and FIG. 20 show that 4MFA is the most effective for WPT at any orientation, in comparison to all other configurations.

The complete WPT system can be characterized in terms of end-to-end efficiency, from the DC supply source to the device application load $R_L$ ($\eta_{DC\text{-}Load}$). This can be calculated as indicated below.

$$\eta_{DC\text{-}Load} = \frac{P_{Load}}{P_{DC}} \qquad (13)$$

With reference to Equation (13), $P_{DC}$ is the total DC input power to the system (i.e., into the power amplifier and transfer link) and $P_{Load}$ is the real power dissipated in the load $R_L$. Table V summarizes the efficiency of the air-core, WFR$_4$, 4MF and 4MFA configurations. It is found that the efficiency of the power transfer depends on the coupling coefficient between the coils and their quality factors. The coupling coefficient essentially depends on the relative size of the primary and secondary coils, and their spatial arrangement. Also, the efficiency increases with increased primary current.

TABLE V total efficiency ($\eta_{DC-Load}$)

| Configuration | 1.0 A primary current (%) | 1.5 A primary current (%) | 2.0 A primary current (%) | 2.5 A primary current (%) |
|---|---|---|---|---|
| Air-core, 0° | 0.38 | 0.52 | 0.63 | 0.77 |
| Air-core, 30° | 0.17 | 0.37 | 0.46 | 0.56 |
| Air-core, 60° | 0.04 | 0.10 | 0.18 | 0.22 |
| Air-core, 90° | 0 | 0 | 0 | 0 |
| 4MF, 0° | 0.42 | 0.6 | 0.76 | 1.13 |
| 4MF, 30° | 0.31 | 0.45 | 0.57 | 0.73 |
| 4MF, 60° | 0.11 | 0.15 | 0.19 | 0.23 |
| 4MF, 90° | 0 | 0 | 0 | 0 |
| 4MFA, 0° | 0.44 | 0.61 | 0.84 | 1.5 |
| 4MFA, 30° | 0.39 | 0.52 | 0.68 | 0.98 |
| 4MFA, 60° | 0.18 | 0.25 | 0.3 | 0.36 |
| 4MFA, 90° | 0 | 0.01 | 0.018 | 0.02 |
| WFR$_4$, 0° | 0.1 | 0.15 | 0.22 | 0.27 |
| WFR$_4$, 30° | 0.06 | 0.10 | 0.13 | 0.17 |
| WFR$_4$, 60° | 0.1 | 0.02 | 0.03 | 0.04 |
| WFR$_4$, 90° | 0 | 0 | 0 | 0 |

Some comparisons can be made between the simulation results and the experimental results, in relation to induced voltage improvements from the addition of ferrite components. Note that the simulation results are non-resonant, while the experimental results are resonant, hence, only comparisons of normalized trends can be made. Table VI shows the total flux $\psi_{SP}$ calculated from the simulation results (from Table I), and the induced voltage $V_{ind}$ measured from experiment (from Table IV). Also included is the normalized percent variation (NPV), defined as: $\psi_{SP}/(\psi_{SP}$ at 0°), and $V_{ind}/(V_{ind}$ at 0°) for simulation and experiment, respectively. For WPT, $V_{ind}$ is directly proportional to the total flux $\psi_{SP}$ passing through the secondary, so normalized comparisons can be made. For the air-core configuration and the WFR$_4$ configuration, it can be seen that the NPV for the simulation matches the NPV obtained in certain embodiments quite well. For the 4MF configuration, the NPV for simulation and experiment are relatively close, however, discrepancies are observed for the 30° and 60° orientations. For the 4MFA configuration, there are significant differences in NPV between simulation and experiment. The simulation predicts that the angled ferrites should create a flatter induced voltage between the 0°-60° orientations, with a notable increase at 90°. However, results disclosed herein show a more gradual variation in $V_{ind}$ across the orientations, also with a reasonable improvement at 90°.

TABLE VI

Comparison between simulation results and experimental results.

| | Simulation | | Experiment | |
|---|---|---|---|---|
| Configuration | Total Flux $\Psi_{SP}$ through the Coil (Wb) × 10$^{-8}$ | Normalized Percent Variation (%) | Induced Voltage in Secondary ($V_{ind}$) | Normalized Percent Variation (%) |
| Air-core, 0° | 2.95 | 100 | 17.1 | 100 |
| Air-core, 30° | 2.56 | 87 | 14.6 | 85 |
| Air-core, 60° | 1.48 | 50 | 9.1 | 53 |
| Air-core, 90° | 0 | 0 | 0.14 | 1 |
| 4MF, 0° | 4.14 | 100 | 29.3 | 100 |
| 4MF, 30° | 3.61 | 87 | 23.5 | 80 |
| 4MF, 60° | 2.17 | 53 | 13.1 | 45 |
| 4MF, 90° | 0 | 0 | 0.32 | 1 |
| 4MFA, 0° | 3.46 | 100 | 33.6 | 100 |
| 4MFA, 30° | 3.33 | 96 | 27.3 | 81 |
| 4MFA, 60° | 2.64 | 76 | 16.2 | 48 |
| 4MFA, 90° | 0.85 | 25 | 4.1 | 12 |
| WFR$_4$, 0° | 0.89 | 100 | 10.2 | 100 |
| WFR$_4$, 30° | 0.72 | 82 | 8.1 | 79 |
| WFR$_4$, 60° | 0.40 | 45 | 4 | 39 |
| WFR$_4$, 90° | 0 | 0 | 0.26 | 2.5 |

Figure 21:
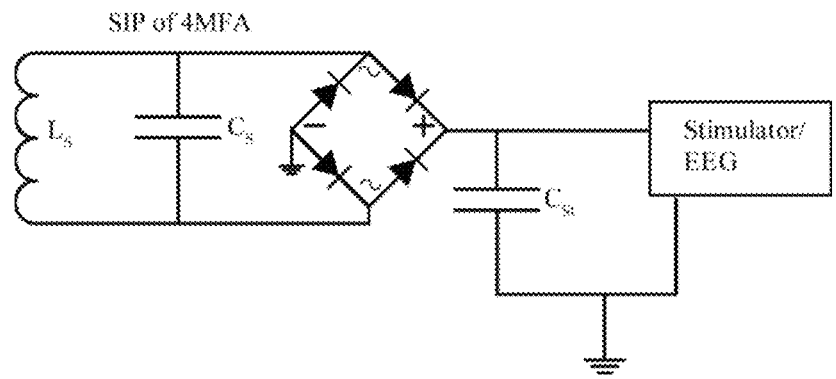
FIG. 21 is a circuit diagram of an exemplary implant device.

The devices disclosed herein can be used as a stimulator and EEG measurement device for small rodents, as shown in FIG. 21. In such an application, the power needed to start up the circuit is 51 mW for a 100-300 milliseconds. After startup, the system can run indefinitely with a power of at least 12 mW. Given the results disclosed herein, the 4MFA configuration is best suited for the stimulator/EEG application to deliver power at typical orientations and positions of the rodent within the animal cage. Although, in some embodiments, the 4MFA does not deliver maximum power at the 90° orientation, the rodent rarely stands in such a pose with the device at this angle, for more than 1 second. To cope with the reduced power, a capacitor bank ($C_{st}$ of 800 µF) can be used to store energy, where the storage period is given by Equation (14) below.

$$\Delta t = \frac{\Delta V \times C}{I_L} = \frac{(9.27-3) \times 800 \times 10^{-6}}{4 \times 10^{-3}} = 1.3 \text{ seconds} \quad (14)$$

SIP of 4MFA

The devices and systems disclosed herein are suitable for transmitting power to a telemetric device located on a freely moving rodent. Since the rodent orientation is variable, the coupling between the primary and secondary coils varies with the orientation between them. Methods to improve coupling at various orientations has been investigated, using ferrite components placed within the secondary coil. FEA simulation is done to find the magnetic flux density distribution around various secondary configurations, to predict the best arrangements of ferrites within the secondary coil. Four exemplary configurations are disclosed and tested to determine the power transfer performance. The 4MF configuration shows a clear improvement in power transfer as compared to WFR$_4$, even though both configurations have similar coil properties, and use the same volume of ferrite components. By tilting the ferrite components of 4MF to create the 4MFA configuration, it is shown that 4MFA will increase power transfer in comparison to all other configurations, at all angular orientations. The 4MFA configuration was shown to provide up to 113 mW of power when oriented at 0° to the primary field, with a WPT efficiency of 1.5%. Since the simulation results are non-resonant, while the experimental results are resonant, only comparisons of normalized trends between the simulation and experiment were made. The devices and systems disclosed herein may also be used to provide power to other small portable electronic devices that are in the category of loosely coupled WPT. For any WPT system, some form of application circuit will reside on a PCB to perform a function. Such a PCB and on-board electronics, may be a relatively large part of the system. In such a case, the device embodiments disclosed herein allow for plenty of volume within the secondary coil winding for application circuits. The winding can be wrapped around the perimeter of the PCB, with four ferrites to be placed in the corners inside the coil. This is in contrast to traditional approaches to tightly wrap the secondary coil around a solid ferrite. By using this approach, minimal addition of ferrite at carefully placed locations, can provide significant improvements in power transfer at most orientations, while leaving plenty of volume for application circuits. Also disclosed herein are method embodiments comprising generating an alternating electrical current in a primary coil so as to induce an alternating current in a secondary coil, the secondary coil having a secondary axis, wherein at least one ferrite rod is within a volume defined by the secondary coil; and coupling the alternating current induced in the secondary coil to a rectifier so as to produce a rectified electrical current. In some embodiments, the rectified electrical current is filtered with a capacitor.

In some embodiments, CTD LCWPT system embodiments can be used to implement a tuning/detuning method to control resonant frequency between the secondary circuit and the primary circuit. Such system embodiments do not require ferrite rods as used in other embodiments described herein. In such CTD LCWPT embodiments, the devices and systems are configured to operate with two different functionalities: (1) a "tuning" function, wherein the secondary circuits' frequency is adjusted to better match the resonant frequency of the primary circuit; and (2) a "detuning" function, wherein the secondary circuits' frequency is adjusted to reduce the resonant frequency match with the primary circuit. Tuning can be used in scenarios where resonant frequency mismatch occurs because of poor orientation between the secondary coil and primary coil; component property variation occurs due to the heating effect on the $L_S C_S$-tank circuit; or, a mutual coupling effect exists from multiple telemetric devices in the primary field. Detuning can be used in scenarios where the secondary circuit harvests too much magnetic flux due to very favorable orientation conditions between the secondary coil and the primary coil. By detuning the resonant frequency, excessive harvesting of magnetic flux can be minimized; such excessive harvesting of magnetic flux can generate a high voltage in the secondary tank, which can lead to excessive power transfer that increases the heat in the device. This rising heat can disrupt functions in the device electronics, and further can lead to deleterious effects on the living tissue of animals when the devices disclosed herein are used as implants. With respect to embodiments described herein, nominal operation of the telemetric device (implant or other) is designated as occurring when the secondary circuit is oriented in a semi-favorable (limiting operation state) orientation between the secondary coil and primary coil.

Tuning can be accomplished by adding capacitance in parallel with the secondary capacitor ($C_s$), to change the overall capacitance value of $L_S C_S$-tank circuit and detuning can be accomplished by removing capacitance in parallel with the secondary capacitor ($C_s$), to change the overall capacitance value of $L_S C_S$-tank circuit. Adding or removing capacitance can be achieved by electronic switching, such as MOSFET based on/off switching, of physical switching capacitors within the $L_S C_S$-tank circuit. In some embodiments, there are two different modes of operation achieved by adding/removing capacitance as follows: (1) a small-adjustment mode, which involves adding/removing (via electronic switching) small capacitor values in the range of 10-70 pF for fine tuning the resonant frequency of the secondary circuit; or (2) a big-adjustment detune mode, which involves adding/removing (via electronic switching) large capacitor values in the range of 100-800 pF to detune the devices when excessively high induced voltage is gathered by the telemetric device, due to favorable orientation between the primary and secondary coils. The small capacitor values of the small-adjustment mode help to tune the secondary circuit when the resonant frequency deviates due to the mutual coupling effect from the multiple secondary circuits, or due to the heating effect. In some embodiments, capacitors exhibit the features of high Q and low ESR, where the dielectric material is generally independent of temperature and its voltage coefficient is generally constant over different applied voltages.

Figure 22:
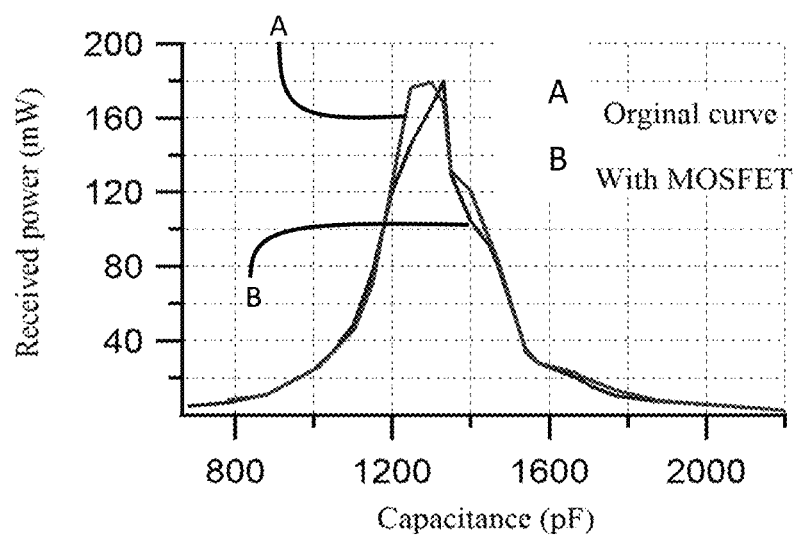
FIG. 22 is a graph of received power (mW) as a function of capacitance (pF), which shows the effect of using metal-oxide semiconductor field-effect transistors as switches to control switching capacitors used in representative devices and systems.

In some embodiments, the secondary coil (inductor, $L_S$) exhibits a high quality factor (Q), shown by the sharp peak curve of FIG. 22). The high Q coil gives a narrow frequency band, which makes the secondary circuit sensitive to the operating frequency of the primary circuit, where the secondary resonant frequency is defined by its $L_S C_S$-tank circuit. The resonant frequency ($w_{res}$) and the quality factor ($Q_S$) of the secondary circuit, using parallel compensation, are defined by Equations 15 and 16:

$$w_{res} = \frac{1}{\sqrt{L_S C_S}} \qquad (15)$$

$$Q_S = \frac{R_{AC}}{w_{res} L_S} = w_{res} C_S R_{AC} \qquad (16)$$

With reference to Equation 16, $R_{AC}$ is the equivalent resistance that corresponds to the real power delivered to the secondary application load. The secondary application load is the collection of all application circuits (e.g., MCU, radio, etc.) on the secondary circuit that consume power. As indicated above, extra (excess) power received by the secondary circuit can become waste heat that increases the heat in the implant, and that can cause a detrimental effect on animal tissue in the long term, and also can overheat the electronic components used with the disclosed devices. Also, this increasing heat may affect the capacitance $C_S$ of the $L_S C_S$-tank depending on the dielectric material of the capacitors, leading to undesirable resonant frequency shift.

Figure 23:
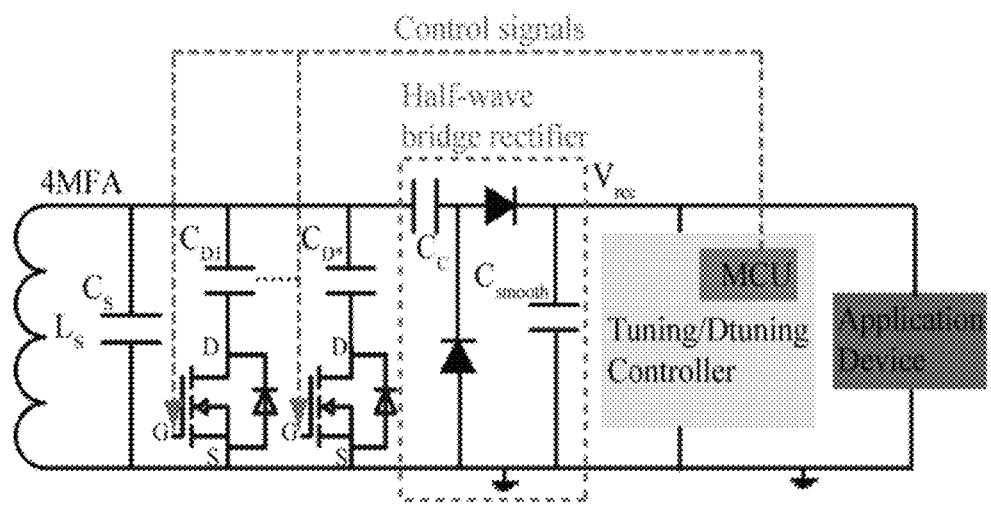
FIG. 23 is a circuit diagram illustrating an embodiment of a device design whereby switching capacitors and a half-wave bridge rectifier are used to tune and/or detune resonant frequency between the device and a primary circuit.

To address these potential issues, the systems described herein can use MOSFETs to switch open (or to close) one or more switching capacitors (such as $C_{D1}$, $C_{D2}$, $C_{D*}$, . . . as illustrated by FIG. 23) that are in parallel to $C_S$, as shown in FIG. 23. This configuration includes an $L_S C_S$-tank, switching elements (e.g., transistors, such as MOSFETS; and switching capacitors), a half-wave bridge rectifier, a secondary application load, and a tuning/detuning MCU that measures the rectified voltage ($V_{rec}$) and controls the switching elements via a control protocol. In particular disclosed embodiments, the switching capacitors (e.g., $C_{D1}$, $C_{D2}$, $C_{D*}$, . . . as shown by FIG. 23) can be connected to the drain of the transistors, while the source of the transistors can be connected directly to the common ground, such as shown in FIG. 23. This configuration can provide the MOSFET with a common ground with respect to the MCU, allowing the control signal to effectively switch the MOSFET on/off. This configuration often utilizes a half-wave bridge (voltage doubler) rectifier between the AC and DC side of the circuit and that is not conventionally used in electronics; however, this configuration permits operation of the MOSFET via a DC control signal from a MCU, since a common ground exists.

As discussed herein, the resonant frequency of the secondary circuit may increase because of the heating effect, which can cause the secondary capacitor ($C_S$) value to drop. In addition, the resonant frequency of the secondary circuit may decrease when the secondary inductance ($L_S$) increases because of the mutual coupling of multiple secondary circuits within the primary field. In the case of inductance change, the increasing inductance can be denoted as $\Delta L$, where the equivalent secondary inductance ($L_{eq}$) due to the multiple secondary coils, is given as:

$$L_{eq} = \Delta L + L_S \tag{17}$$

As result of the multiple secondary circuits, the total reflected impedance ($Z_{rtot}$) from the multiple secondary circuits is given as:

$$Z_{rtot} = \sum_{i=1}^{n} Z_{ri} = n \frac{W^2 M^2}{Z_S} \tag{18}$$

wherein, n is the number of the secondary circuits in the cage. The equivalent mutual inductance and coupling coefficient of the multiple secondary circuits are:

$$M_n = \sqrt{n} M \tag{19}$$

$$k_n = \sqrt{n} k \tag{20}.$$

To compensate for the change $\Delta L$, the secondary capacitance should be:

$$C_S = \frac{1}{w^2 (L_S + \Delta L)} \tag{21}$$

Equation 21 thus provides a theoretical way to determine the amount of corrective capacitance needed to account for an inductive change of $\Delta L$. Since there may be various operational scenarios, the required value of $C_s$, to maintain resonance will be different for various scenarios. As such, some embodiments described herein use multiple switching capacitors as discussed above to tune or detune the resonant frequency of the implant for various scenarios.

Figure 24:
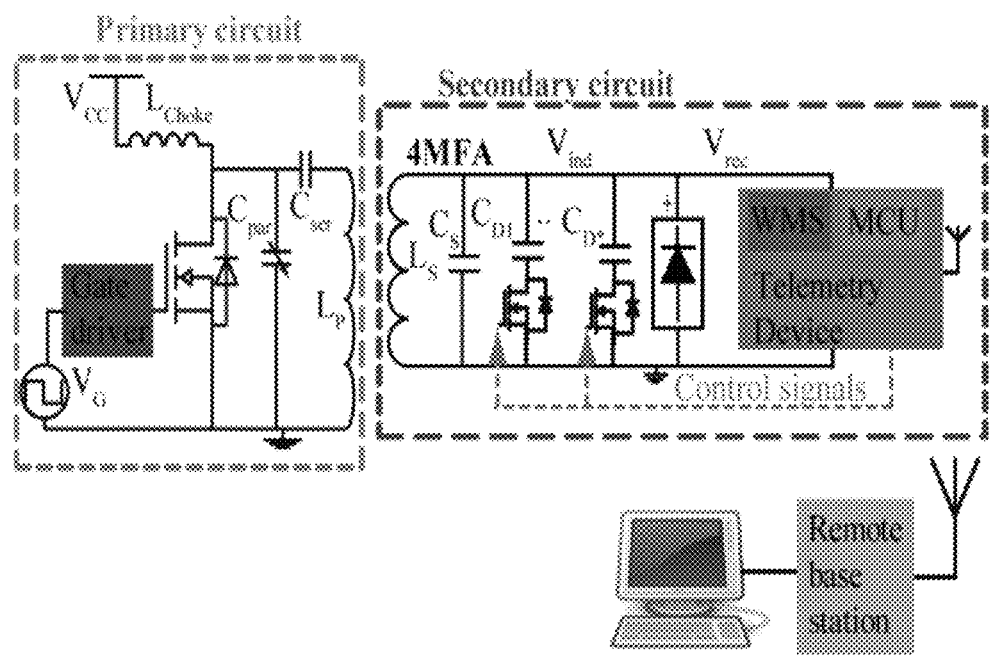
FIG. 24 is a circuit diagram illustrating an embodiment of a system design comprising a primary circuit and a secondary circuit utilizing the device design of FIG. 23.

In some embodiments, a CTD LCWPT system as described above, can be divided into two circuits, namely the primary circuit and the secondary circuit, as illustrated in FIG. 24. As described herein, some embodiments can implement an SP topology to achieve magnetic resonant coupling between the primary circuit and the secondary circuits as illustrated by FIG. 3B. In such embodiments, the power is supplied to the primary circuit using a DC power supply ($V_{CC}$). A signal generator (e.g., Agilent 33250A) provides a square signal wave ($V_G$, duty cycle 0.5) at 1 MHz to a gate driver (e.g., MIC4421) to drive a MOSFET (e.g., IRF840) in a Class-E power amplifier. The Class-E amplifier is used to generate a sinusoidal current ($I_P$) to the primary coil ($L_P$). This primary current ($I_P$) in turn creates an oscillating electromagnetic field. The alternating magnetic field induces a sinusoidal voltage ($V_{ind}$) in the secondary coil ($L_S$). This induced voltage can be rectified within the device by a half-wave bridge (voltage doubler) rectifier. During operation, the MCU of the CTD telemetric device implements the control protocol. The MCU measures $V_{rec}$ via one of its analog inputs (e.g., via a voltage divider circuit) and makes a control protocol decision depending on the measured value $V_{rec}$ and the desired set point voltage value. Using its digital output ports, the MCU switches the MOSFETs "on" or "off" as needed for controlling the resonant frequency. This control scheme is closed loop and occurs locally on the device, with no outside intervention needed. In some embodiments, a wireless measurement system (WMS) can be used to measure the $V_{rec}$ of any device being used. The WMS allows one to monitor performance, and it overcomes many problems associated with using corded oscilloscope probes. The WM, however, is entirely optional. In yet additional embodiments, a 2.4 GHz radio communication can be built into the WMS platform; it can use a handshaking network protocol to transfer the measured data of the device to a base station. Like the WMS, the radio is optional.

In particular disclosed embodiments, the primary circuit comprises a class-E amplifier that uses a series compensation topology, such as that described in FIG. 3C. In some embodiments, the class-E amplifier can deliver a maximum sinusoidal current (peak-to-peak) of 6 A through the primary coil. The MOSFET used in the amplifier can be selected to have a relatively low output capacitance ($C_{oss}$) at high $V_{DS}$ (drain source voltage of the MODFET). In some embodiments, the $C_{oss}$ is effectively absorbed by $C_{par}$. In some embodiments, a zero-voltage-switching inverter (ZVS) of the Class-E power amplifier can be used to identify ideal voltage and current waveforms that minimize switching losses.

In some disclosed embodiments, the secondary circuit comprises a $L_S C_S$-tank and uses ferrites arranged as a 4MFA configuration as described herein. The ferrites, however, are not required in all embodiments. In such embodiments, switching elements (e.g., switching capacitors and transistors, such as MOSFETs), a half-wave bridge (voltage doubler) rectifier, a secondary application load, and a tuning/detuning controller configuration can be used, such as shown by FIG. 23. In a particular disclosed embodiment, two N-channel MOSFETs (e.g., a Si1026X chip) were used for the switching elements. These MOSFETs provide high power handling (e.g., $V_{DS}$ up to 60 V), nanosecond switching capabilities (e.g., 15 ns), and low on-resistance (e.g., 1.4Ω), which do not damp the coupling factor of the $L_S C_S$-tank. In this particular embodiment, the half-wave bridge rectifier was built using switching diodes (e.g., DA4J101K0R), which have a small reverse current (e.g., 100 nA) and a short reverse recovery time (e.g., 3 ns).

To achieve high quality factors, inductors with low effective series resistance can be used with the devices and systems described herein. Such inductors are particularly useful for high frequency operation, due to the skin effect and proximity effect. In some embodiments, the operational frequency range is 1 MHz, which can allow for easy transmission through tissue and to avoid loss problems. To reduce the ESR, multistrand Litz wires can be used. For example, the secondary coil can be wrapped around a PCB using 44 AWG Litz wire, with a total coil size of 13.25×20.25×1.6 mm (length×width×height). The parameters of representative primary and secondary coils are listed in Table VII, as measured using a HP 4285A LCR meter. In some embodiments, the $L_S C_S$-tank can be created by using a 1313 pF capacitor (CO to resonate the secondary circuit at 1 MHz sharply. A HP 4193A Vector Impedance Meter can be used to measure the resonant frequency and impedance of the $L_S C_S$-tank of the secondary circuit, where the measured impedance ($R_{LC}$) at the resonant frequency was 7.04 kΩ in some representative embodiments.

TABLE VII

Parameters of the primary and the secondary coils

| Configuration | AWG | Q | L (μH) |
|---|---|---|---|
| Primary coil ($L_P$) | 22 | 165 | 38.5 |
| Secondary coil ($L_S$) | 44 | 55 | 19.3 |

In some embodiments, the impedance matching within the secondary circuit is configured to avoid internally reflected power loss from the secondary load $R_L$ to the $L_S C_S$-tank. As discussed herein, maximum power transfer can occur when the resistive component of the load $R_L$ is conjugately matched. As such, some embodiments described herein utilize a secondary load $R_L$ value of 10 kΩ.

Figure 25:
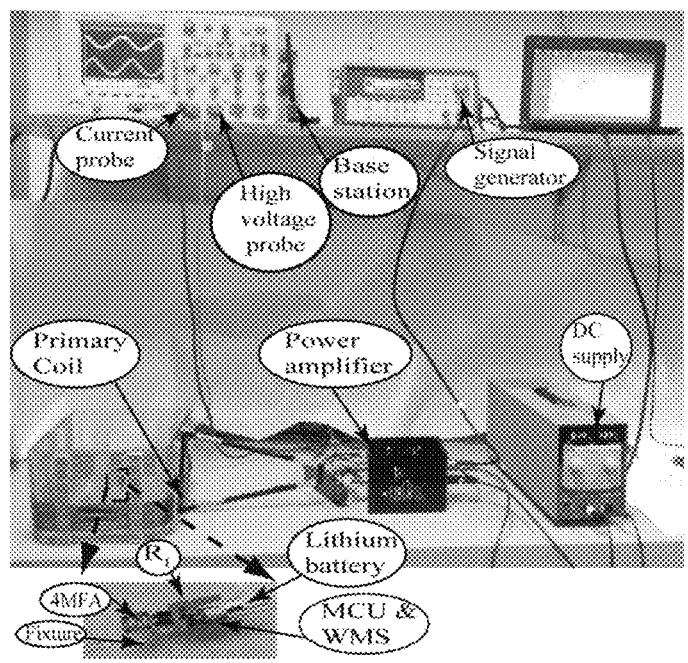
FIG. 25 is a photographic image of a representative CDT-LCWPT system.

FIG. 25 shows a representative setup of a CTD LCWPT system as described herein. The output voltage of the Class-E power amplifier can be measured by a high voltage probe and the primary current ($I_P$) can be measured by a current probe (e.g., Agilent N2893A). The high voltage and current probes can be connected to the oscilloscope, as shown in FIG. 25. Code written for operation of devices used with small animals can be executed on the on-board MCU of a device. The device can be used to monitor $V_{rec}$ for a particular interval of time, such as every 400 milliseconds. The device can communicate wirelessly via a radio link to the base station that is connected via USB to a laptop that collects performance data of the CTD system.

In evaluating performance of a CTD LCWPT system described herein, four parameters are controlled/examined: (1) the current applied to the primary coil; (2) the internal matched impedance ($R_L$) of the secondary circuit (the device); (3) the secondary coil orientations (e.g., 0°, 30°, 60°, and 90°) with respect to the x-y plane of the primary coil; and (4) the position of secondary circuit inside the primary coil of the system. In some embodiments, parameter (1) can comprise applying a primary coil current ($I_P$) of 2 A (sinusoidal, peak-to-peak); parameter (2) can comprise using a secondary load $R_L$ value of 10 kΩ; parameter (3) can comprise orientations of the device that are achieved when the device is attached or implanted in a subject (which can be simulated using four different fixtures to hold the secondary circuit at various angular orientations); and parameter (4) can comprise placing the secondary circuit (or device) at various different locations in the primary cage, such as in the middle of the primary cage. In particular examples, these parameters were used in combination with a WMS, which was used to measure the power received by the CTD secondary circuit. The WMS can be powered using a lithium-polymer battery; thus, its operation can occur independently from the secondary circuit performance, as shown in FIG. 25. In one example, the WMS was used to measure the rectified voltage ($V_{rec}$) of the secondary circuit, and then the received power at the various orientations was calculated. In this particular example, the maximum power transferred (e.g., 180 mW) occurred when the secondary coil was centered in the primary coil, and oriented parallel (e.g., 0°) to the primary coil. The received power decreased as the orientation increased, where the received powers at 30°, 60°, and 90° were 127 mW, 38.2 mW, and 3.5 mW, respectively.

Figure 26:
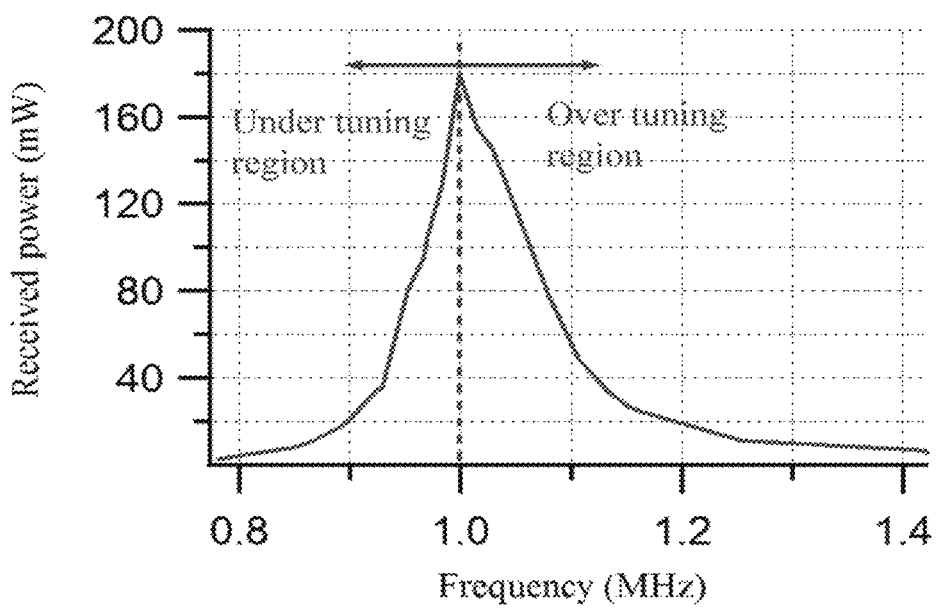
FIG. 26 is a graph of received power (mW) as a function of frequency (MHz) showing representative results obtained from using a device embodiment described herein.

In another example, the operational parameters of switching capacitors used to tune/detune the secondary circuit were determined by obtaining a power vs. capacitance curve (e.g., curve A of FIG. 22)) of the secondary circuit. Different values of capacitors were used to alter the total secondary capacitance ($C_S$) of the secondary tank capacitor, to obtain the curve of the received power versus the frequency/$C_S$, such as is shown by FIGS. 26 and 22. As can be seen by FIG. 26, the curve has a sharp peak, and the maximum received power is 180 mW at the resonant frequency of 1 MHz, when using a total $C_S$=1313 pF. Curve A of FIG. 22 shows the experiments with capacitors only, and without the use of MOSFETs within the $L_S C_S$-tank.

The effect of using MOSFETs within the $L_S C_S$-tank circuit also was evaluated in one example. The measurements described above were conducted, but with added MOSFET switches to evaluate the MOSFET effect on the $L_S C_S$-tank. A noticeable difference was observed between the received power vs. capacitance when using the MOSFETs, as shown by curve B of FIG. 22. Without being limited to a particular theory, it is currently believed that this difference is due to the stray capacitance of the MOSFET that changes in the electromagnetic field. The stray capacitances of a MOSFET are given as Equations 22-24:

$$C_{iss} = C_{GD} + C_{GS} \quad (22)$$

$$C_{oss} = C_{DS} + C_{GD} \quad (23)$$

$$C_{rss} = C_{GD} \quad (24)$$

where, $C_{iss}$ (input capacitance) is measured between the gate and the source, with the drain shorted to the source. $C_{oss}$ (output capacitance) is measured between the drain and the source, with the gate shorted to the source. $C_{rss}$ (reverse transfer capacitance) is measured between the drain and the gate, with the source is connected to the ground. $C_{GD}$, $C_{GS}$ and $C_{DS}$ are the gate-drain capacitor, gate-source capacitor and drain-source capacitor, respectively.

Representative received power curves of the secondary circuit are shown in FIG. 26 (which is a graph of received power vs. frequency), and FIG. 22 (which is a graph of received power vs tank capacitance $C_S$). With reference to FIG. 26, the region to the right of the peak represents an over tuning region where the secondary operation has a frequency higher than the resonant frequency (1 MHz) and the region to the left of the peak represents an under tuning region where the secondary operation has a frequency lower than the resonant frequency (1 MHz). In particular embodiments of the systems disclosed herein, the $L_S C_S$-tank can be configured to start-up (that is, begin operating) in the over tuning region, which assumes that device start-up might occur in an ideal orientation. In some embodiments, a desired orientation of the system comprises a configuration where the secondary coil plane and primary coil plane are parallel. In such embodiments, if the device (or secondary circuit) frequency is tuned exactly to the primary circuit frequency, too much power can be transferred causing excessive heat and possibly damage. Thus, some embodiments comprise starting-up the device (or secondary circuit) out of tune. Then, if the MCU senses that more power transfer is needed, it will begin to drop the total tank capacitance $C_S$, by adding switching capacitors in parallel to $C_S$, and thereby better tune the secondary frequency to the primary frequency. In the poorest orientations, the control system will try to exactly match the secondary circuit frequency to the primary circuit frequency.

The impedance value ($R_{LC}$) of the secondary circuit can change in some examples when the different values of capacitors ($C_{D*}$) are switched; thus, a combination of switched capacitors ($C_{D*}$), which achieves a constant impedance value of the secondary circuit, can be used while switching between these capacitors ($C_{D*}$). Moreover, the value of the secondary tank capacitor ($C_S$) can be selected to be lower than 1313 pF to resonate the secondary circuit in the over tuning region. Adding and removing capacitance provides the ability to move the secondary resonance to the operating point and the under tuning region, or to remain resonant in the over tuning region.

Embodiments using the tuning and detuning system embodiments described herein can employ on/off switching of capacitors via MOSFETs, yet in some embodiments, many possible values of capacitance can be added or removed. To achieve this, several combinations of capacitors can be simultaneously switched. For example, in one example, four discrete capacitors were used, but were switched in combinations to achieve 16 possible total capacitance values. In a particular example, the main capacitance was $C_S$=680 pF, and the four switchable capacitors were $C_{D1}$=470 pF, $C_{D2}$=100 pF, $C_{D3}$=68 pF and $C_{D4}$=47 pF. The disclosed devices/systems, however, are not limited to only four capacitors as the present disclosure contemplates embodiments wherein even five or more switchable capacitors can be used to achieve 32 or more capacitive values. Also, fewer than four switching capacitors can be used.

As described herein, system embodiments can be tuned to increase power transfer (e.g., to compensate for undesirable frequency variations within the secondary circuit) or detuned to avoid excessive heat. In some embodiments, switching capacitors (such as $C_{D1}$ and $C_{D2}$, FIG. 23) are used to detune the secondary circuit when the heat increases due to high induced voltage. A third switching capacitor (such as $C_{D3}$, FIG. 23) can be used to tune the secondary circuit when two secondary circuits are at 0° orientation in the same cage and separated by a distance of 0 cm. A fourth switching capacitor (such as $C_{D4}$, FIG. 23) can be used to compensate for the decreasing secondary capacitance ($C_S$) as a result of the rising temperature from the high induced voltage. Table VIII provides exemplary possible switching capacitor combinations (states) as well as the associated measured resonant frequency, impedance ($R_{LC}$), on-board rectified voltage ($V_{rec}$), and the received power. As can be seen by Table VIII, the measured impedance ($R_{LC}$) is almost constant over switching between the four capacitors, which prevents the internal reflected impedance problem.

TABLE VIII

Measured resonant frequency, impedance, rectified voltage and received power of switching capacitors of the secondary circuits.

| $C_{D1}$ 470 pF | $C_{D2}$ 100 pF | $C_{D3}$ 68 pF | $C_{D4}$ 47 pF | $F_{res}$ (MHz) | $R_{LC}$ (kΩ) | $V_{rec}$ (V) | P (mW) |
|---|---|---|---|---|---|---|---|
| 1 | 1 | 1 | 1 | 1 | 6.26 | 42.4 | 179.6 |
| 1 | 1 | 1 | 0 | 1.024 | 6.3 | 37.6 | 141.2 |
| 1 | 1 | 0 | 1 | 1.028 | 6.33 | 37.5 | 140.3 |
| 1 | 1 | 0 | 0 | 1.037 | 6.33 | 32.4 | 104.6 |
| 1 | 0 | 1 | 1 | 1.053 | 6.31 | 29.1 | 84.7 |
| 1 | 0 | 1 | 0 | 1.056 | 6.37 | 28.9 | 83.8 |
| 1 | 0 | 0 | 1 | 1.066 | 6.31 | 25.9 | 67.1 |
| 1 | 0 | 0 | 0 | 1.076 | 6.36 | 22.8 | 52.2 |
| 0 | 1 | 1 | 1 | 1.236 | 6.85 | 11.5 | 13.2 |
| 0 | 1 | 1 | 0 | 1.243 | 6.88 | 10.2 | 10.4 |
| 0 | 1 | 0 | 1 | 1.257 | 6.9 | 9.8 | 9.6 |
| 0 | 1 | 0 | 0 | 1.279 | 6.94 | 9.3 | 8.8 |
| 0 | 0 | 1 | 1 | 1.283 | 7 | 9.1 | 8.2 |
| 0 | 0 | 1 | 0 | 1.29 | 6.92 | 8.9 | 7.9 |
| 0 | 0 | 0 | 1 | 1.333 | 7.04 | 7.6 | 5.8 |
| 0 | 0 | 0 | 0 | 1.338 | 7.05 | 7.2 | 5.1 |

Figure 27:
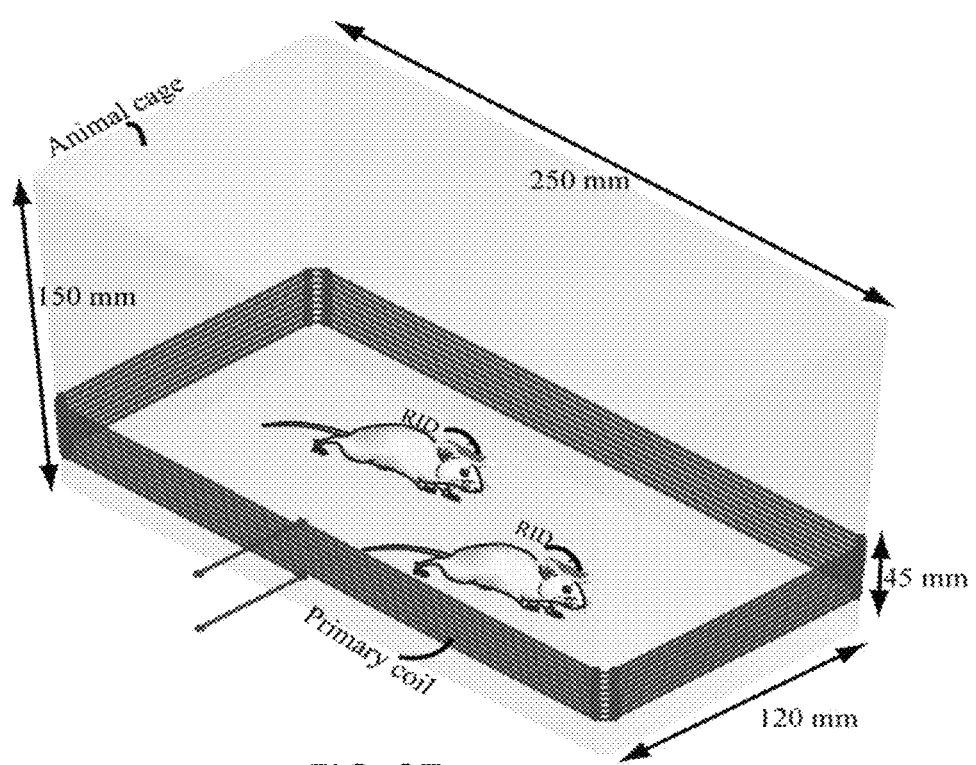
FIG. 27 illustrates a representative embodiment of a system for small animal-based telemetry acquisition, where device embodiments are positioned on the heads of a plurality of freely moving animals and resonant frequencies of each device embodiment from each animal can be controlled individually.

As described herein, the devices and systems described herein can be used such that multiple different devices are used in combination with the same primary circuit. Such embodiments were evaluated in one example as follows: A setup with multiple secondary circuits in the same primary coil was prepared (see FIG. 27), wherein two fixtures were used to mimic the orientations of two devices. One secondary circuit (or fixture) was held stationary, while the other circuit (or fixture) was moved with respect to the stationary fixture. For example, received power was measured on the stationary secondary circuit, which was held at the 0° orientation in the center of the cage. The other secondary circuit was moved around the cage and rotated by 0°, 30°, 60°, and 90° with respect to the fixed secondary circuit. The received power is a function of the orientation and distance between the two secondary circuits. Table IX lists the measured value of $V_{rec}$ and received power, of the fixed secondary circuit. The maximum power variation was 6% when the moving secondary circuit is at the same orientation (0°) and 0 cm away (that is, the edges of the two circuits touch each other) from the fixed secondary circuit, as shown in Table IX.

TABLE IX

Measurements of the rectified voltage and the received power of the fixed secondary circuit.

| | 0° | | 30° | | 60° | | 90° | |
|---|---|---|---|---|---|---|---|---|
| Distance (cm) | $V_{rec}$ (V) | P (mW) | $V_{rec}$ (V) | P (mW) | $V_{rec}$ (V) | P (mW) | $V_{rec}$ (V) | P (mW) |
| 0 | 40.9 | 168 | 41.6 | 173 | 41.9 | 175.9 | 42.2 | 177.9 |
| 1 | 41.2 | 170 | 41.9 | 175.6 | 42.2 | 177.9 | 42.4 | 179.5 |
| 2 | 41.8 | 174 | 42.3 | 178.5 | 42.4 | 179.5 | 42.4 | 179.5 |
| 3 | 42.1 | 146.8 | 42.4 | 179.5 | 42.4 | 179.5 | 42.4 | 179.5 |
| 4 | 42.3 | 178.6 | 42.4 | 179.5 | 42.4 | 179.5 | 42.4 | 179.5 |
| 5 | 42.4 | 179.5 | 42.4 | 179.5 | 42.4 | 179.5 | 42.4 | 179.5 |
| 6 | 42.4 | 179.5 | 42.4 | 179.5 | 42.4 | 179.5 | 42.4 | 179.5 |

The secondary inductance ($L_{eqv}$) was measured using an HP 4285A LCR meter when the two secondary coils were at the same orientation and their edges touched each other. The $\Delta L$ was equal to 1.2 µH. To tune the secondary circuit due to the $\Delta L$, Equation (14) was used to find out the required capacitor ($C_D$) to be added or removed. This switching capacitor was equal to 64 pF and was used to compensate for the dropped power as a result of mutual coupling between two secondary circuits.

In some example, extra received power by the secondary circuit occurred when the secondary circuit was oriented equal to or less than 30° to the primary electromagnetic field. Thus, an embodiment of the disclosed CTD system could be used to detune the resonance of the secondary circuit when the secondary coil induced high voltage that increased the temperature. As discussed above, the rectified voltage ($V_{rec}$) was, in some embodiments, compared to the load requirements every 400 milliseconds, to control the resonance of the secondary circuit.

The examples described above corroborate that the devices of the systems described herein can be tuned and detuned to control induced voltage/current. This can be done, in some embodiments, by adjusting the status of the switching capacitors ($C_{D*}$) that are listed in Table VIII. For example, when the secondary circuit is oriented between 0° and 30° orientations, the programmed state "1001" corresponds to connection of switching capacitors $C_{D1}$ (470 pF) and $C_{D4}$ (47 pF) in parallel with the tank capacitor, thereby setting the resonant frequency (1.066 MHz), allowing for a received power of approximately 67 mW (that is, with reference to Table VIII, $C_{D1}$ and $C_{D4}$ are "1" and $C_{D2}$ and $C_{D3}$ are "0"). If needed, the control system will change the programmed state to "0111," which corresponds to connection of switching capacitors $C_{D2}$ (100 pF), $C_{D3}$ (68 pF) and $C_{D4}$ (47 pF), thereby changing the resonant frequency (1.236 MHz), and limiting the power transferred to 13.2 mW (that is, with reference to Table VIII, $C_{D1}$ is "0" and $C_{D2}$, $C_{D3}$, $C_{D4}$ are "1"). This state "0111" can be used when the secondary circuit is oriented between 30° and 60° orientations. When using these states, the secondary circuit can provide the power requirements for the application of the telemetric device. In particular embodiments, the telemetric device is used as a small animal (e.g., rodent) implant that can record EEG or EMG bio-signals from the animals.

Mutual coupling effects that occur between multiple secondary coils also can be observed, as can the thermal effect on the secondary capacitance ($C_S$). Both of these effects can affect (e.g., detune) the resonant frequency of the secondary circuits by 5-20 kHz. As a result of this resonant frequency mismatch, the received power by the secondary circuit drops slightly. For example, the maximum reduction of the received power by the secondary circuit is 6% due to mutual coupling effects when the edges of the two secondary circuits touch each other at the same orientation, as shown in Table IX. Also, the resonance of the primary circuit detunes by 10 kHz when multiple (e.g., two or more) secondary circuits are used in the same primary coil.

Having described and illustrated the principles of the disclosed technology with reference to the illustrated embodiments, it will be recognized that the illustrated embodiments can be modified in arrangement and detail without departing from such principles. For instance, elements of the illustrated embodiments shown in software may be implemented in hardware and vice-versa. Also, the technologies from any example can be combined with the technologies described in any one or more of the other examples. It will be appreciated that procedures and functions such as those described with reference to the illustrated examples can be implemented in a single hardware or software module, or separate modules can be provided. The particular arrangements above are provided for convenient illustration, and other arrangements can be used.

In view of the many possible embodiments to which the principles of the disclosed technology may be applied, it should be recognized that the illustrated embodiments are only representative examples and should not be taken as limiting the scope of the disclosure. Alternatives specifically addressed in these sections are merely exemplary and do not constitute all possible alternatives to the embodiments described herein. For instance, various components of systems described herein may be combined in function and use. We therefore claim as our invention all that comes within the scope and spirit of the appended claims.

We claim:

1. A device, comprising:
    a coil defining a coil axis;
    a tank capacitor electrically coupled to the coil and wherein the coil and the tank capacitor define a resonant frequency;
    a rectifier coupled to the coil so as to receive and rectify an electrical voltage induced in the coil;
    four switching capacitors electrically coupled to the tank capacitor, wherein two switching capacitors are configured to tune the device when heat increases due to high induced current, one switching capacitor is configured to tune the device, and one switching capacitor is configured to compensate any decreasing secondary capacitance of the tank capacitor; and
    a microcontroller electrically coupled to the four switching capacitors so as to tune or detune the resonant frequency established by the coil, the tank capacitor, and the four switching capacitors.

2. The device of claim 1, further comprising a ferrite rod having a rod axis and situated to be at least partially proximate to the coil.

3. The device of claim 1, wherein the rectifier is a half-wave bridge rectifier.

4. The device of claim 1, wherein the rectifier is electrically coupled to a stimulator component.

5. The device of claim 1, further comprising a transistor electrically coupled to at least one of the four switching capacitors and the microcontroller, wherein the microcontroller is coupled to at least one of the four switching capacitors so as to tune or detune the resonant frequency.

6. The device of claim 5, wherein at least one of the four switching capacitors is connected to the transistor such that at least one of the four switching capacitors is connected to a drain of the transistor and a transistor source is connected to ground.

7. The device of claim 1, wherein the microcontroller is configured to control at least one of the four switching capacitors by switching the one or more transistors on or off.

8. The device of claim 1, wherein at least one of the four switching capacitors is coupled in parallel with the tank capacitor.

9. The device of claim 1, wherein at least one of the four switching capacitors is coupled in series with the tank capacitor.

10. The device of claim 1, wherein the microcontroller includes an analog input configured to adjust a capacitance associated with at least one of the four switching capacitors.

11. A system, comprising:
    a primary circuit comprising (i) a primary coil defining a primary coil axis; and (ii) a primary tank capacitor coupled to the primary coil; and
    a secondary circuit comprising (i) a secondary coil defining a secondary coil axis; (ii) a secondary tank capacitor; wherein the secondary coil and the secondary tank capacitor define a resonant frequency; (iv) a rectifier coupled to the secondary coil so as to receive and rectify an electrical voltage induced in the secondary coil by the primary coil; (v) four switching capacitors electrically coupled to the tank capacitor, wherein two switching capacitors are configured for tuning in response to high induced current, one switching capacitor is configured to tune the with respect to the primary circuit, and one switching capacitor is configured to compensate any decreasing secondary capacitance of the secondary tank capacitor; and (vi) a microcontroller electrically coupled to the four switching capacitors so as to tune or detune a secondary resonant frequency of the secondary circuit with respect to a primary resonant frequency associated with the primary coil and the primary tank capacitor.

12. The system of claim 11, wherein the primary circuit further comprises a power supply, a signal generator, a gate driver, an amplifier, or a combination thereof.

13. A method, comprising:
    inducing an oscillating voltage in a secondary circuit with an oscillating electromagnetic field in a primary circuit, wherein the secondary circuit is part of a telemetric device associated with an animal and the primary circuit is part of a cage in which the animal is physically confined;

measuring a voltage associated with the oscillating voltage in the secondary circuit with a microcontroller using an analog input; and providing four switching capacitors in the secondary circuit, wherein two switching capacitors are configured for tuning in response to high induced current, one switching capacitor is configured to tune the with respect to the primary circuit, and one switching capacitor is configured to compensate any decreasing secondary capacitance of a secondary tank capacitor; and adjusting a resonant frequency difference between the secondary circuit and the primary circuit based on the measured voltage with one or more of the four switching capacitors.

14. The method of claim 13, wherein the resonant frequency difference is adjusted by tuning a resonant frequency of the secondary circuit.

15. The method of claim 13, wherein the measured voltage is a rectified voltage associated with an alternating voltage in the secondary circuit.

16. The method of claim 13, wherein the resonant frequency difference is adjusted by adjusting at least one of the four switching capacitors of the secondary circuit.

17. The method of claim 13, wherein the resonant frequency difference is adjusted by applying a control voltage to a transistor coupled to at least one of the four switching capacitors.

18. The method of claim 13, further comprising electrically coupling a microcontroller so as to adjust at least one of the four switching capacitors of the secondary circuit so as to adjust the resonant frequency difference.

19. The method of claim 13, wherein the resonant frequency difference is adjusted so as to decrease the measured rectified voltage.

20. The method of claim 13, wherein the resonant frequency difference is adjusted so as to increase the measured rectified voltage.

* * * * *